(12) United States Patent
Willen et al.

(10) Patent No.: US 7,167,916 B2
(45) Date of Patent: Jan. 23, 2007

(54) COMPUTER OS DISPATCHER OPERATION WITH VIRTUAL SWITCHING QUEUE AND IP QUEUES

(75) Inventors: James W. Willen, Shoreview, MN (US); Hans Christian Mikkelsen, Afton, MN (US); John Carter, Lakeville, MN (US); Peter John Hancock, Afton, MN (US); Michael F. Stanton, Lino Lakes, MN (US); Robert Morris, Fort Walton, FL (US)

(73) Assignee: Unisys Corporation, Blue Bell, PA (US)

( * ) Notice: Subject to any disclaimer, the term of this patent is extended or adjusted under 35 U.S.C. 154(b) by 813 days.

(21) Appl. No.: 10/232,199

(22) Filed: Aug. 30, 2002

(65) Prior Publication Data

US 2004/0054999 A1 Mar. 18, 2004

(51) Int. Cl.
*G06F 15/173* (2006.01)
(52) U.S. Cl. .................... 709/226; 718/100; 718/104
(58) Field of Classification Search ................ 709/226; 718/100, 102–104
See application file for complete search history.

(56) References Cited

U.S. PATENT DOCUMENTS

| | | | | |
|---|---|---|---|---|
| 6,105,053 | A  * | 8/2000 | Kimmel et al. | 718/105 |
| 6,430,593 | B1 * | 8/2002 | Lindsley | 718/103 |
| 6,523,058 | B1 * | 2/2003 | Fung et al. | 718/100 |
| 6,728,959 | B1 * | 4/2004 | Merkey | 718/102 |
| 6,912,712 | B1 * | 6/2005 | Myung | 718/101 |
| 6,986,137 | B1 * | 1/2006 | King et al. | 718/104 |
| 7,000,232 | B2 * | 2/2006 | Jones et al. | 718/102 |
| 2003/0172104 | A1* | 9/2003 | Hooman et al. | 709/103 |
| 2003/0204552 | A1* | 10/2003 | Zuberi | 709/103 |

* cited by examiner

*Primary Examiner*—Abdullahi Salad
(74) *Attorney, Agent, or Firm*—Beth L. McMahon; Mark T. Starr

(57) ABSTRACT

Driving task dispatching by an operating system in a multiprocessor computer system is accomplished with a virtual switching queue which accepts highest priority tasks from multiple switching queues which in turn are accessed by instruction processors seeking tasks. Overload, plucking and stealing of tasks may be used to effectively balance load within the computer system. Dynamic reconfiguration used where regular queues lose underlying instruction processors.

16 Claims, 18 Drawing Sheets

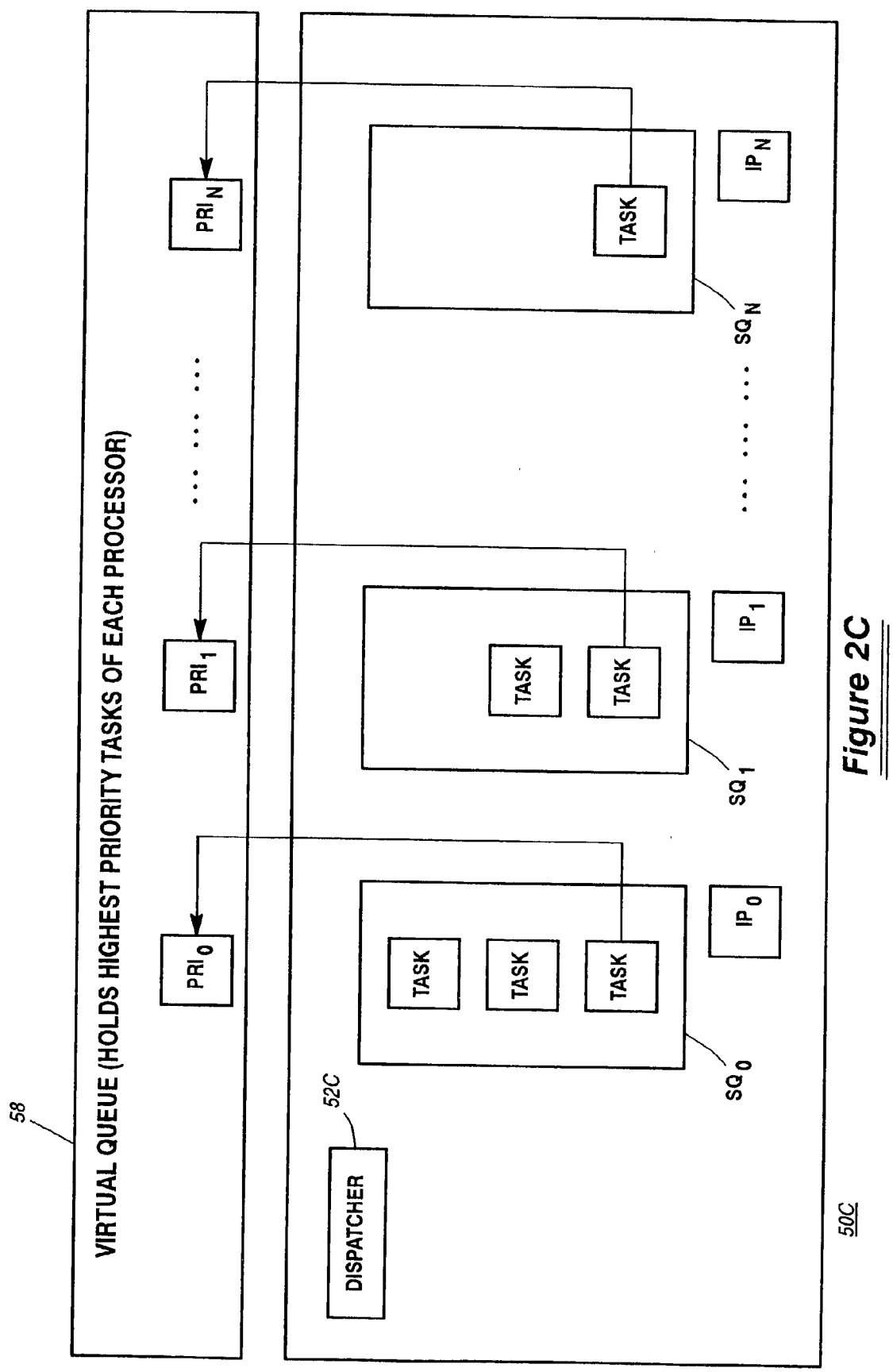

| | | | | | |
|---|---|---|---|---|---|
| P0 | B0 | TLC0 | POD0 | SQ0 | SQ2 | SQ6 | SQ14 |
| P1 | B0 | TLC0 | POD0 | SQ0 | SQ2 | SQ6 | SQ15 |
| P2 | B1 | TLC0 | POD0 | SQ0 | SQ2 | SQ7 | SQ16 |
| P3 | B1 | TLC0 | POD0 | SQ0 | SQ2 | SQ7 | SQ17 |
| P4 | B2 | TLC1 | POD0 | SQ0 | SQ3 | SQ8 | SQ18 |
| P5 | B2 | TLC1 | POD0 | SQ0 | SQ3 | SQ8 | SQ19 |
| P6 | B3 | TLC1 | POD0 | SQ0 | SQ3 | SQ9 | SQ20 |
| P7 | B3 | TLC1 | POD0 | SQ0 | SQ3 | SQ9 | SQ21 |
| P8 | B4 | TLC2 | POD1 | SQ1 | SQ4 | SQ10 | SQ22 |
| P9 | B4 | TLC2 | POD1 | SQ1 | SQ4 | SQ10 | SQ23 |
| P10 | B5 | TLC2 | POD1 | SQ1 | SQ4 | SQ11 | SQ24 |
| P11 | B5 | TLC2 | POD1 | SQ1 | SQ4 | SQ11 | SQ25 |
| P12 | B6 | TLC3 | POD1 | SQ1 | SQ5 | SQ12 | SQ26 |
| P13 | B6 | TLC3 | POD1 | SQ1 | SQ5 | SQ12 | SQ27 |
| P14 | B7 | TLC3 | POD1 | SQ1 | SQ5 | SQ13 | SQ28 |
| P15 | B7 | TLC3 | POD1 | SQ1 | SQ5 | SQ13 | SQ29 |

CACHE NEIGHBORHOODS — SWITCHING QUEUES

*Figure 4A*

| SQ# | NEIGH. | TASK(s) | RUNIDs |
|---|---|---|---|
| SQ0 | POD | | APP2 |
| SQ1 | POD | a, b, c, d | |
| SQ2 | SUBPOD | e, f | |
| SQ3 | SUBPOD | g | |
| SQ4 | SUBPOD | | |
| SQ5 | SUBPOD | | |
| SQ6 | IP PAIR | | |
| SQ7 | IP PAIR | | |
| SQ8 | IP PAIR | | |
| SQ9 | IP PAIR | | |
| SQ10 | IP PAIR | | |
| SQ11 | IP PAIR | | |
| SQ12 | IP PAIR | | |
| SQ13 | IP PAIR | | |
| SQ14 | INDIV. IP | | |
| SQ15 | INDIV. IP | | |
| SQ16 | INDIV. IP | | |
| SQ17 | INDIV. IP | | |
| SQ18 | INDIV. IP | | |
| SQ19 | INDIV. IP | | |
| SQ20 | INDIV. IP | | |
| SQ21 | INDIV. IP | | |
| SQ22 | INDIV. IP | | |
| SQ23 | INDIV. IP | | |
| SQ24 | INDIV. IP | | |
| SQ25 | INDIV. IP | | |
| SQ26 | INDIV. IP | | |
| SQ27 | INDIV. IP | | |
| SQ28 | INDIV. IP | | |
| SQ29 | INDIV. IP | | |

*Figure 4B*

ALL DISPATCHING CONTROLS ARE SHOWN AS CONCEPTUAL ARRAYS, FIRST ELEMENT REPRESENTS LOWEST NUMBERED PROCESSOR

PROCESSOR CONTROLS – ARRAY PER PROCESSOR

STEALING ORDER, AS DESCRIBED IN PRIOR PATENT APPLICATION
`- 1 - 2 - - - 3 - - - - 4 - - -` 131

STEAL–FROM MASK – (SYSTEM WITH NO DEDICATION) ALSO PLUCK-FROM MASK
`YYYYYYYYYYYYY` 132

STEAL–FROM MASK – (PROCESSOR IS MEMBER OF DEDICATED SUBPOD THAT IS NOT ALLOWED TO DO NON-DEDICATED WORK) ALSO PLUCK-FROM MASK
`- - - - - - - - - YYYY` 133

STEAL–FROM MASK – (PROCESSOR IS MEMBER OF A SYSTEM THAT HAS A DEDICATED SUBPOD THAT IS ALLOWED TO DO NON-DEDICATED WORK.) IN SUCH A SYSTEM, THE INDIVIDUAL TASK CONTROLS (BELOW) ARE USED TO DISTINGUISH TASKS WHICH ARE ALLOWED TO BE STOLEN.
`YYYYYYYYYYYYY` 134

TASK CONTROL – ARRAY PER TASK

STEALABLE MASK – NON DEDICATED TASK
`YYYYYYYYYYYYY` 135

STEALABLE MASK – DEDICATED TASK
`- - - - - - - - - YYYY` 136

*Figure 10*

COMPUTER OS DISPATCHER OPERATION WITH VIRTUAL SWITCHING QUEUE AND IP QUEUES

RELATED APPLICATIONS

This is related to patent application Ser. Nos. 10/231,618 and 10/231,622 (filed on even date herewith) which have substantially the same disclosure but claim different inventions. These different inventions solve related problems in different ways, but they are incorporated herein by this reference.

BACKGROUND OF THE INVENTION

1. Field of the Invention

This invention relates generally to the field of managing tasks that instruction processors are assigned to do within a computer system having multiple instruction processors, and particularly to allow for purposeful and efficacious allocation of instruction processor resources among various ones of the tasks.

2. Background Information

Background on the problems encountered in this art of tuning multiprocessor computer systems for preferred performance is relevant to understanding the solutions described herein. In the field of multiprocessor computer systems, it can be difficult to strike the right balance of work assignments between and among the processors so that the computing tasks are accomplished in an efficient manner with a minimum of overhead for accomplishing the assigning of tasks. This appropriate balance will vary considerably depending on the needs of the system's users and to some extent upon the system architectures. User controls therefore are sometimes necessary and must be able to work appropriately with automatic load balancing that will be done by the operating system. As server consolidation programs progress, large multiprocessor computer systems appear to be becoming more prevalent and this art should become correspondingly more important.

The preferred design should not allow a majority of the available tasks to be assigned to a single processor (nor to any other small subset of all processors). If this occurs, the small subset of processors is kept too busy to accomplish all its tasks efficiently while others are waiting relatively idle with few or no tasks to do. Thus the system will not operate efficiently. It should therefore have a load balancing or work distribution scheme to be efficient.

Multiprocessor systems are usually designed with cache memories to alleviate the imbalance between high performance processors and the relatively slow main memories. Cache memories are physically closer to their processors and so can be accessed more quickly than main memory. They are managed by the system's hardware and they contain copies of recently accessed locations in main memory. Typically, a multiprocessor system includes small, very fast, private cache memories adjacent to each processor, and larger, slower cache memories that may be either private or shared by a subset of the system's processors. The performance of a processor executing a software application depends on whether the application's memory locations have been cached by the processor, or are still in memory, or are in a close-by or remote processor's cache memory. To take advantage of cache memory (which provides for quicker access to data because of cache's proximity to individual processors or groups of processors) an assignment of tasks based on affinity with a processor or processor group that has the most likely needed data already in local cache memory(ies) to bring about efficiencies should also be part of the design. As is understood in this art, where a processor has acted on part of a problem (loading a program, running a transaction, or the like), it is likely to reuse the same data or instructions present in its local cache, because these will be found in the local cache once the problem is begun. By affinity we mean that a task, having executed on a processor, will tend to execute next on that same processor or a processor with fast access to the cached data. (Tasks begun may not complete due to a hardware interrupt or for various other well-understood reasons not relevant to our discussion). Where more than one processor shares a cache or a cache neighborhood, the design for affinity assignment could become complicated, and complexity can be costly, so the preferred design should be simple. (A group of processors belonging to what is generally referred to as having been affinitized we refer to as a "Processor Group").

(Language in the computer arts is sometimes confusing as similar terms mean different things to different people and even to the same people in different contexts. Here we use the word "task" as indicating a process. Tasks are often thought of as consisting of multiple independent threads of control any of which could be assigned to different processor groups, but we will use the word task more simply, referring to a single process when we use the word).

These two goals, affinity and load balancing, seem to be in conflict. Permanently retaining task affinity could lead to overloading some processors or groups of processors. Redistributing tasks to processors to which they have no affinity will yield few cache hits and slow down the processing overall. These problems get worse as the size of the multiprocessor computer systems gets larger.

Typically, computer systems use switching queues and associated algorithms for controlling the assignment of tasks to processors. Typically, these algorithms are considered an Operating System (OS) function. When a processor "wants" (is ready for) a new task, it will execute the (usually) re-entrant code that embodies the algorithm that examines the switching queue. (This code is commonly called a "dispatcher.") It will determine the next task to do on the switching queue and do it. However, while it is determining which task to do, other processors that share the switching queue may be waiting for access to the switching queue, which the first processor will have locked in order to do the needed determination (using the dispatcher code).

Accordingly, there is a great need for efficient dispatcher programs and algorithmic solutions for this activity in multiprocessor computer systems.

The inventors herein have developed some solutions to these and other problems in this field, which are described in detail in U.S. patent applications with Ser. Nos. 09/920,023 and 09/038,547 (both being incorporated herein in their entireties by this reference), but which still leave room for improvement.

In summary, these prior documents describe the use of one switching queue per processor to minimize the overheads of task selection in an environment that supports task affinity. Load balancing is addressed partially by the use of round-robin scheduling mechanisms when a task is created. The task is allocated to the next idle processor in the system, if there is one, and to the next busy processor if not. To balance the load of existing tasks across the processors, the OS keeps track of how busy each processor is, averaged over some period of time (generally a fraction of a second). If a processor becomes idle and has an empty switching queue then it may look to see if it should or can "steal" a task from another processor's queue. (The stealing processor then executes the "stolen" task). The stealing decision is based on thresholds. For stealing to occur at all, the other processor (being potentially stolen from) must be busier than a threshold value. An idle processor may then steal from another's queue if the other is busier on average and the difference in relative busyness exceeds a further threshold. That threshold value depends on the cache neighborhood they share. If the two share a small cache neighborhood (for example, on the same bus), then the overhead of switching the task to that processor is low, so the threshold is set correspondingly low. For processors in the larger cache neighborhoods, (for example, on different crossbars) the thresholds are higher. The intent is to balance the system load while minimizing the overhead of fetching cached data from remote cache memories.

The inventions described in this document seek to further optimize the performance of the system's dispatching and affinity mechanisms for the user's applications. We address the problem of balancing the needs of performance (through affinity) with those of enforcing the priorities of task execution. (Task execution priorities are set by a user and a system should respond positively to such user needs). We also seek to further improve the performance of the user's applications by locating shared written-to data in a cache where it can be most efficiently accessed by all the sharing tasks.

(Just for clarity of explanation and simplicity, we use the all-inclusive term "user" throughout this document, generally to define a privileged actor who has rights through the security barriers of the computer system and the OS to perform tasks of the nature and risk to the system as the utility functions we describe herein. It may be one or several individuals or even a program that has such privileges and performs such functions. We also, where appropriate, may refer to this "user" as a systems administrator.)

Priority

There is a natural conflict between the requirements of (execution) priority and efficiency. For example, the most efficient task to execute, one that recently ran on a processor and so has data residue in the memory cache, may be of lower priority than other less efficient alternatives. Some users, possibly just for specific applications or tasks, may prefer the efficiencies of affinity to the rigorous application of priority because the system throughput may be more important than the priority of a given set of tasks. Others may construct applications that are dependent on the rigorous application of priority for proper operation. Use of the invention of this patent permits the user to profitably tailor the relationship between affinity and priority within a computer system to meet this range of concerns.

Data Sharing

In a system with many caches, some local to individual processors and some shared between processors, performance can be considerably enhanced by ensuring that shared data which is frequently updated is located in caches that can be efficiently accessed by all the tasks that share it. Our invention gives the user the tools for identifying the sharing tasks and by using such tools, conveniently confining the execution of these sharing tasks to the processors that are in the neighborhood of such a cache.

The general terminology used with this document assumes some basic pattern of computer organization and can be illustrated in a chart as follows.

SYSTEM HARDWARE DESIGNCache Neighborhoods determined by:
Instruction Processors (IPs) Caches, System Topology, & Cache/memory access times.

USER'S SYSTEM CONFIGURATION
Instruction Processors & Caches, installed and enabled.
(THIS IS DYNAMICALLY VARIABLE)
PROCESSOR GROUPS
User's system's processors within a cache neighborhood.
SWITCHING QUEUES
Queues of tasks waiting to execute on one or more processors
DATA SHARING GROUPS
Groups of programs that are likely to share memory-resident data.
USER'S APPLICATION MIX
A mix of applications with different degrees of importance and varying data-sharing habits
(THIS IS DYNAMICALLY VARIABLE)

Background Chart

For any instance of a system, the system's hardware design (as shown in the Chart above) is fixed. A given architecture has a maximum number of processors and private and shared caches. The system's topology and hardware components result in a set of access times between processors, caches, and the memory. These design features should be expressed as a configuration message to any affinity algorithms. A given collection of processors, their internal private caches, and any shared caches is referred to as a "cache neighborhood".

The user's system configuration (as shown in the Chart) will usually be a subset of the maximum designed configuration. The physical configuration in use may be also be dynamically changed while the system is running, by the operator or automatically, and may involve adding or removing processors and caches. The effective performance of the processors and the system will change as cache neighborhoods expand and contract or processors are added and removed.

The performance characteristics of the user's application mix (as shown in the Chart) depend on the applications' data sharing characteristics and the caching neighborhoods in which they execute. To maintain cache coherency for a unit of data that is (or may be) updated by multiple tasks running on multiple processors, only one processor is allowed to update the data at a time. The next processor that requires the data may have to fetch it from another processor's cache. This fetching is much faster if the processor is close by. Hence there is advantage in confining all the tasks that share some data to the processors of a small cache neighborhood. In our invention described in the above referenced application Ser. No. 09/020,023 the selection of a processor for a new task uses a round-robin technique to help in balancing the system's load across all processors, so the tasks that share an application's data may be spread over a wide cache neighborhood. The current invention seeks to optimize application performance by scheduling the application's tasks onto the smallest sufficient cache neighborhood. This optimization requires information from the user, as only the user is aware of the application's data sharing characteristics, its importance to the user, its need for processor power, its interactions with other applications, and the relationship between applications and tasks. The application load and mix may also vary significantly with time or day, so the user may need to also vary the application information he supplies concomitantly with any contingency or in advance for known load variance.

An appropriate solution therefore should give the user the tools for optimizing the performance of the user's application mix. The tools should competently deal with a dynamically changing application mix and a dynamically changing system hardware configuration.

Also, giving the user some control over allocation of instruction processor resources is generally a positive thing, if the operating system has some override capacity to protect itself and some of its built-in efficiencies. Microsoft has also provided for some limited and static instances a method of dedicating processor-program affinity to individual processors or groups of processors, but to date, their system lacks any intelligent automatic oversight, enabling user control to actually hurt system performance if not done correctly. {See the document at http://support.microsoft.com/directory/article.asp?ID=KB;EN-US;Q299641, indicating how this is accomplished for SQL or find additional related background at http://www.microsoft.com/hwdev/platform/proc/SRAT.asp, which describes the Microsoft Static Resource Affinity Table. (This second site is available under click-through license to Microsoft only, and was last known updated on Jan. 15, 2002).}

Overall, if the User can modify performance of the system to meet the user's day-to-day needs, the computer system will be better accepted. However, these user-initiated changes need to take into consideration the architectural features of the computer system and their limitations in order to be effective.

Accordingly, the inventors herein describe a computer system improvement directed primarily to improving the efficiency and usability of multiprocessor computer systems having affinity dispatchers.

BRIEF DESCRIPTION OF THE DRAWINGS

FIGS. 2A–2C are block diagrams illustrating possible switching queue configurations within a multiprocessor system.

FIG. 4A is a table of Instruction Processor and Switching Queue organizations available in a computer system.

FIG. 4B is a table identifying tasks assigned to one of the switching queues of FIG. 4A.

FIG. 10 illustrates a set of data structures used in plucking and stealing.

SUMMARY OF THE INVENTION

Figure 1:
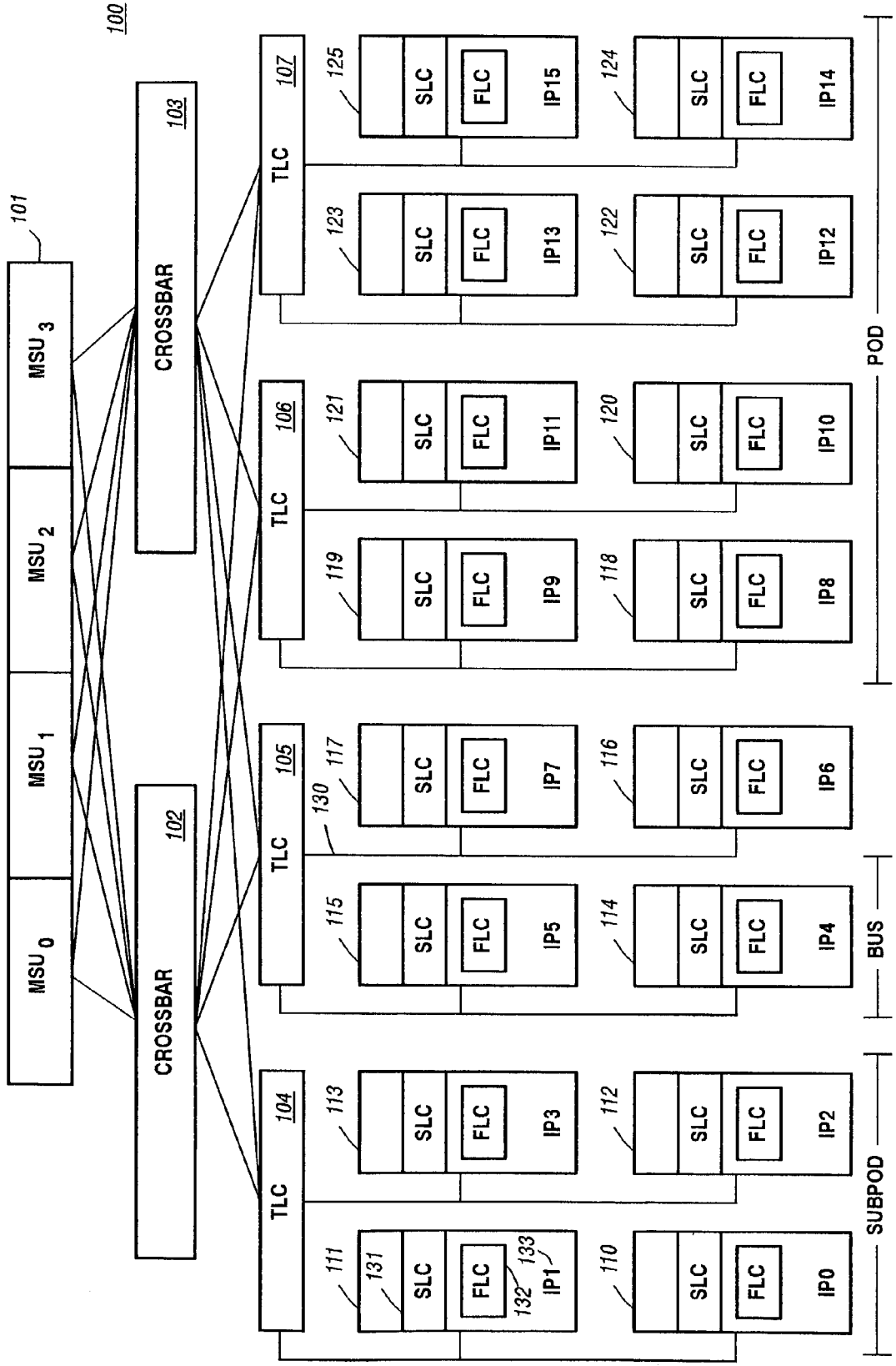
FIG. 1 is a block diagram of a multiprocessor computer system with which the invention can be used.

The inventors have provided a system and method by which a user of a multiprocessor computer system can optimize the performance of important applications by directing the OS to run them on the most efficient available combination of processors and caches. In effect, the user is "predicting" that certain tasks will perform better if they execute within some limited cache neighborhood.

This application is directed to computer OS dispatcher operation with virtual switching queue and IP queue.

As illustrated in the chart in the BACKGROUND section above, the invention introduces the concept of data-sharing groups. The data-sharing groups should be defined by the user based on the user's knowledge of which tasks are sufficiently related to constitute an application. By specifying data-sharing groups for such "applications" the user, using this invention, maximizes the performance through enabling efficient sharing of data that is frequently updated. The user can use familiar OS terminology to declare certain important tasks to be a data-sharing group whether they constitute an "application" or not. These data-sharing groups can be dynamically redefined whenever the user wants to change the application mix or the relative importance of applications.

In a preferred embodiment, a data-sharing group comprises a list of tasks, and includes all the related threads of control. This can be enhanced so that a data-sharing group could comprise all the transactions that update a particular database or segment thereof. For example, it could include all the reservation transactions and queries for an airline. It could also be applied to the OS itself, such that, for example, a data-sharing group could include all the OS tasks involved in network message handling. The data-sharing group could also include a combination of the examples above and others, but grouping them together is only worthwhile if they actually share data; otherwise there should be multiple data-sharing groups.

In explaining how our inventions work, we illustrate the concept by employing a "RUNID" or "TASKID" that a user uses to identify these tasks, transactions, threads, and the like with a dedicated data-sharing group, but the reader should understand that various methods and variables may be used in like manner to accomplish the same or a substantially similar result. A variable like the Task ID will typically be used in a message to the Operating System (OS). It may have different forms for different kinds of tasks and the format of such variables should of course be mated or adapted to the OS and the Computer System in which it is used.

These inventions also deal with potentially conflicting requirements of efficiency (through affinity) and execution priority. The prior patent applications identified in the Background Information describe a mechanism wherein efficiency considerations prevail over considerations of priority. Such a system is adequate for many users who do not require a rigorous application of priority. For users who require a more rigorous approach to handling priority needs, especially for example the use of preemptive priority, this invention provides two algorithms that address this requirement, while at the same time optimizing system performance using affinity.

We describe two rudimentary forms and two fundamental algorithmic approaches to our solutions.

The first algorithmic approach provides a low-overhead "virtual switching queue" made up of the highest priority tasks identified to all the system's processors. The system is required to honor those priorities, selecting the highest priority task, within a range, regardless of efficiency, but still applying the efficiencies of affinity when there is no such task queued within the system. Thus, there is a single queue for all the processors for the highest priority tasks (as defined by the user plus some OS defaults) and another queue for all tasks for every processor.

The second algorithm seeks to generalize the per-processor switching queues previously described in the Ser. No. 09/920,023 patent application. Here we use switching queues that are shared by all the processors within the processor group that shares a user's priority requirements for a cache neighborhood. This means only one queue to look to for tasks for each processor (and this one queue is shared with all the other processors in the user-or-system-defined neighborhood). Although there are advantages, these come to this algorithmic solution at the cost of less precise affinity, since the queue represents affinity to the cache neighborhood rather than to an individual processor.

To implement the second algorithm, this invention introduces dynamic switching queues that the user can map onto the system configuration. A switching queue is serviced by the group of processors (processor group) that constitute a caching neighborhood. (It will be more clear with reference to the Detailed Description, but a brief reference to the Background Chart will be useful for understanding caching neighborhoods at this point). The user chooses the size of cache neighborhood (for example, 1, 2, 4, or 8 processors) that best matches the execution needs of the defined data-sharing groups. This is valuable in the context of a system that allows a user to dedicate a data-sharing group, since in this way, the user can appropriately size the processor group to the need of his dedicated tasks.

Due to the structure of the inventors' computer systems, it is simpler and thus currently preferred to configure equal-sized processor groups only; however, within the teachings of this invention it is also possible to configure unequal sized processor groups, so that the user can allocate a larger group of processors to match the needs one of a specific data-sharing group and smaller groups of processors for less needy applications. In preferred embodiments the OS will maintain or have access to a data table of possible configurations of processor groups to simplify the handling of related user messages and to limit some poor user choices.

The user employing this invention preferably establishes a relationship between data-sharing groups and processor groups in various ways described within. Various alternative configurations are described. The user can identify a data-sharing group either to a specific processor group or the system can designate a default processor group. More than one data-sharing group can be identified to a processor group. A provision for determining if a processor group has enough processing capacity is also disclosed. The user can also control whether these processor groups are allowed to execute other, non-dedicated tasks (tasks not dedicated to a processor group), whether a processor group with some dedicated tasks can accept other task dedication, whether a processor group can accept non-dedicated tasks while it has some dedicated tasks, whether the processor group with dedicated tasks can actively steal non-dedicated tasks during non-busy periods from outside the processor group. These control details preferably are defined all within the simple messages a user can send to the controlling operating system. In one enhancement, the user can supply only a measure of the processing power needed by the data-sharing group, and the system chooses the optimal caching neighborhood size for the data-sharing group, configures the appropriate processor group, and dedicates, in a default manner or a user defined manner, the data-sharing group to that processor group.

In our invention, even though the user is exercising explicit dedication to processor groups, the system will still attempt to balance its own overall load, within the constraints of the user's wishes with respect to overload, priority, and dedication, to the extent feasible.

In preferred embodiments, the user can control whether the idle processors within a processor group are allowed to steal tasks from other, busier processor groups. A possible enhancement is to also monitor and detect if a selected processor group is too busy and in such event, to employ a mechanism for moving a data-sharing group to another, less busy processor group. There are also mechanisms to prevent a user from dedicating the entire system to a data-sharing group, and a plurality of alternatives is presented to accomplish this function.

These relationships between data-sharing groups and processor groups reflect the needs of the user's applications and the availability of the cache neighborhoods. The user of preferred embodiments can redefine the application needs at any time, and may need to do so regularly at various times, for example, the end of a shift or the beginning of overnight records consolidation. The hardware configuration may also change in response to processor failures, the removal of components for test or upgrade, or the addition of new hardware. In all these cases, the system must respond to these changes, and reapply the configuration and mapping of data-sharing groups and processor groups. Doing these configuration changes with applications active may require the system to handle the dynamic creation and deletion of switching queues, and to move tasks transparently and reliably between switching queues so that the configuration of processor groups is accommodated by the extant switching queues.

Accordingly, the details of the inventions are set forth within.

DETAILED DESCRIPTION OF THE PREFERRED EMBODIMENTS

The features of the inventions will be described in sections. We begin with a hardware design that the invention was designed to be used with so that the parts of that system can be discussed with reference to how the invention functions. Then we describe various configurations available in user hardware that provide some complications.

Next, we describe the concept of Priority, which was mentioned in the Background section. Following that we begin to discuss two main branches of the invention, Tailored scope queues, and Virtual Queues. After a general discussion about these designs and their implementations, we explain what a data sharing group is, and how it is used by tailored scope queues to accomplish the goal of efficacious task assignment in accord with the user's desires. Variations on this theme are then considered and explained in terms of various embodiments. Then we discuss how the two branches of the invention respond to User's System Configuration and/or User's Application Mix with Dynamic configuration.

I. System Hardware Design

One form of a multiprocessor computer system 100 which could take advantage of this invention is described with reference to FIG. 1. Larger versions, which employ the invention, can be built in a modular manner using more groups of components similar to the ones shown, but for purposes of this discussion a 16-processor version suffices. (We have established the principles of this invention in a 32 processor configuration and larger systems should also be able to use the principles taught herein). In the system illustrated there is a central main memory 101 having a plurality of memory storage units $MSU_{0-3}$. These can be configured to form a long contiguous area of memory or organized into many different arrangements as is understood in this industry. The MSUs are each connected to each of the two crossbars 102, 103, which in turn are connected to the highest level of cache in this exemplary system, the Third Level Caches (TLCs) 104–107. These TLCs are shared cache areas for all the Instruction Processors (IPs) underneath them. Data, instruction and other signals may traverse these connections similarly to a bus, but advantageously by direct connection through the crossbars in a well-known manner. The processors IP0–15 in the currently preferred embodiment are instruction processors of the "2200" variety in a Cellular MultiProcessing (CMP) computer system from Unisys Corporation in the preferred embodiment but could be any processors. A store-through cache is closest to each instruction processor (IP), and since it is the first level cache above the instruction processor, it is called for a First Level Cache (FLC). The second level caches and third level caches are store-in caches in the preferred embodiment computer systems. The Second Level Caches (SLCs) are next above the FLCs, each IP has its own SLC as well as a FLC.

Note that the blocks 110–125, each containing a FLC, SLC and IP, are connected via a bus to their TLC in pairs and that two such pairs are connected to each TLC. Thus the proximity of the SLCs of IP0 and IP1 is closer than the proximity of IP2 and IP3 to the SLCs of IP0 and IP1. (The buses are illustrated as single connecting lines; example: TLC 105 connected by bus 130 to blocks 117 and 116). Each of these buses is an example of the smallest and usually most efficient multiprocessor cache neighborhood in this embodiment. Two threads that share data will execute most efficiently when confined to one of these cache neighborhoods.

Also, the proximity of IP0–3 to TLC 104 is greater than the proximity of any of the other IP's to TLC 104. By this proximity, a likelihood of cache hits for processes or tasks being handled by most proximate IPs is enhanced. Thus, if IP1 has been doing a task, the data drawn into SLC 131 and TLC 104 from main memory (the MSUs 101) is more likely to contain information needed for that task than are any of the less proximate caches (TLCs 105, 106, 107 and their SLCs and FLCs) in the system 100. Tasks that require 3 or 4 processors will execute most efficiently in a TLC cache neighborhood, called a SubPod.

Note that we may use the following terminology to refer to various neighborhoods by size. A Pod would consist of the caches under a crossbar 102, 103, consisting of two TLCs and the lower level caches underneath them. A SubPod would be those cache memory areas subsidiary to and including a TLC. In FIG. 1 a TLC 104 has the SubPod indication shown. A Bus neighborhood consists of the cache memories of two IPs, illustrated on FIG. 1 as including the caches of IPs 4 and 5. The Pod attached to crossbar 103 is indicated to include TLCs 106 and 107.

It is also productive to mention at this juncture that where choices need to be made between neighboring IPs within a cache neighborhood for purposes of stealing for load balancing, "buddy lists" may be kept to minimize the overhead of choosing. This will be discussed in appropriate detail later, and reference may be made to U.S. patent application Ser. No. 09/920,023's filed on Aug. 1, 2001, and its FIG. 4 and accompanying discussion for background information, although at that time such neighboring IPs were not called "buddies."

It should be noted that this system 100 describes a 16 IP system, and that with two additional crossbars, the system could be expanded in a modular fashion to a 32 IP system, and that such systems can be seen for example in the Unisys Corporation CMP CS7802 computer system, and could also be applied to the Unisys ES7000 computer system with appropriate changes to its OS, in keeping with the principles taught herein. It should also be recognized that neither number of processors, nor size, nor system organization is a limitation upon the teachings of this disclosure. For example, any multiprocessor computer system, whether NUMA (Non-Uniform Memory Architecture) architected or UMA (Uniform Memory Architecture) as in the detailed example described with respect to FIG. 1 could employ the teachings herein to improve performance as described in the background section above.

This computer system 100 serves to illustrate the Multi-Processing (MP) Factor referred to in this document. The MP Factor is a commonly-used measure of the efficiency of a multiprocessing system. For example, a 4 processor system which has a work capacity equivalent to 3.8 single processors is said to have a 0.95 (3.8/4) MP Factor. The overhead of accessing a relatively slow shared memory and of managing data integrity across all the memory caches does not grow linearly, so the MP Factor usually declines as the number of processors increases. For example, a 16 processor system may only have a work capacity equivalent to 12 single processors, an MP Factor of 0.75.

In this example system, and on many other systems with a complex bus and cache structure, there are some distinct performance steps in the MP factor as the number of processors increases. For example, the MP factor of the four processors within a SubPod is markedly better than the MP factor for the 5–8 processors in a pod.

By dedicating data-sharing groups to the processors of the smaller cache neighborhoods, this invention seeks to take advantage of the greater efficiencies of those neighborhoods. In an idealized example, four applications could each be dedicated to a 4-processor SubPod and achieve a much higher total MP factor than would be available in a 16 processor system without dedication. The applications would have the advantage of the high MP factor of a 4 processor system, yet still be able to share the network and database resources of the full 16 processor system.

The User's System Configuration

The user's system may be a subset (or a superset) of the configuration shown in FIG. 1. For example, an 8 processor system may have been delivered to the user, with two TLCs (104 and 106) and 8 processors (110–113 and 118–121). That configuration can be split by the user into two partitions, each of which is under the control of a separate instance of the OS. Of the processors (110–113) within TLC 104's cache neighborhood, any could be marked DOWN (disabled) because of a hardware failure or because the user only contracted for, say, a 3-processor software key. Any of those circumstances could subsequently change and cause the OS to dynamically add the processors back into the configuration.

In the current hardware series, a superset is already available having 32 processors and larger systems with 64 or even more processors may also be created.

II. Priority

For reasons detailed in our previous patent application Ser. No. 09/920,023, a single switching queue, commonly used in multiprocessor systems, becomes inefficient when the computer operating system supports processor affinity. If there is a single switching queue per system then processors scanning the queue for work must ignore tasks with affinity to other processors, extending the time required for the scan. The scan is typically performed with the switching queue's data under a lock (and thus unavailable to any other processors while locked). Passing over other processors' tasks extends the time that the single switching queue must be locked and this can be a severe performance impact, particularly on a system with many processors.

For efficiency, the design described in the '023 patent application described using a switching queue per processor rather than a single shared queue. In that design, a processor's switching queue only holds tasks with affinity for that processor and consequently contention for the single processor's switching queue's lock is minimized.

However, departing from the commonly used single switching queue means that the design must compensate for the loss of the automatic system-wide load-balancing and execution priority that comes with using a single queue.

Load-balancing is handled in the '023 patent application's design by allowing idle processors to steal work from the queues of processors that are busier on average. That design, which takes into account the impacts of cross-cache memory requests, is described in detail in the above-referenced '023 patent application.

In the invention described here, the execution priority (i.e., the preferred order in which tasks are executed) is handled according to the needs of the user's applications. In the computer industry, many systems function well with only a non-preemptive priority mechanism. "Nonpreemptive" means that the dispatcher will not preempt a currently executing task with one of higher priority unless the task voluntarily gives up control of the processor or its assigned time-slice ends. In such systems the use of priority is relatively simple, ensuring, for example, that transactions will have execution priority over batch processing and program development. In the '023 patent application, such non-pre-emptive use of priority is used in the individual processor queues. At the system level, the effects of priority are not as uniform, as there are cases where one processor will run a low priority task from its own queue when there are higher priority tasks queued to other processors, but this is considered a reasonable trade-off against the performance benefits of processor affinity under most circumstances.

There are, however, some applications that are designed to make explicit use of the system's priority mechanisms. These are typically "real time" applications, which must respond with an output message to an external stimulus such as an input message within a time constraint. For example, the application may have medium priority "producer" tasks that generate output messages and put them onto an output queue; and the application may have high priority "consumer" tasks that are responsible for taking output messages from the queue and sending them over the network. Such an application will need to rely on the dispatcher to apply the priorities rigorously so that, for example, it does not have consumer tasks queued behind producer tasks causing it to overflow the space it has for waiting output messages.

Two alternative mechanisms are provided in this invention for more rigorous application of execution priorities. The first, a "tailored scope queues" design, involves the replacement of the concept of individual processor switching queue with shared switching queues tailored to cache neighborhoods, and the second, a "virtual queue" design, involves the use of an additional system-wide or application-wide virtual queue.

Tailored Scope Queues

In the first, the "tailored scope queues" design, instead of having a switching queue per processor there is a single shared queue for all the processors (the processor group) within a cache neighborhood. Thus, within such a caching neighborhood, the priority can be easily maintained, as there is a single queue and the high priority tasks will always be taken first from that queue. Even in a system with multiple caching neighborhoods, there are also more processors available to execute a high priority task on each of the queues. For a complete solution, though, it may be necessary to dedicate all the tasks of a priority-sensitive application to the cache neighborhood, and have a single queue shared by all the processors in that neighborhood, so that all the application's tasks are guaranteed to be on the single queue. (Dedication of tasks to queues is discussed later in this document.)

This tailored scope queues design is a trade-off against performance, as the tasks now have affinity to the processor group, rather than to a single processor, thus limiting the likelihood of advantage from the potential benefit from reusing any cache residue within the processor's immediate cache. Therefore such a tailored scope switching queue design is usually preferable for use by small cache neighborhoods such as a bus or a SubPod, but not for large neighborhoods such as a Pod where up to 8 processors share the switching queue.

Figure 2A:
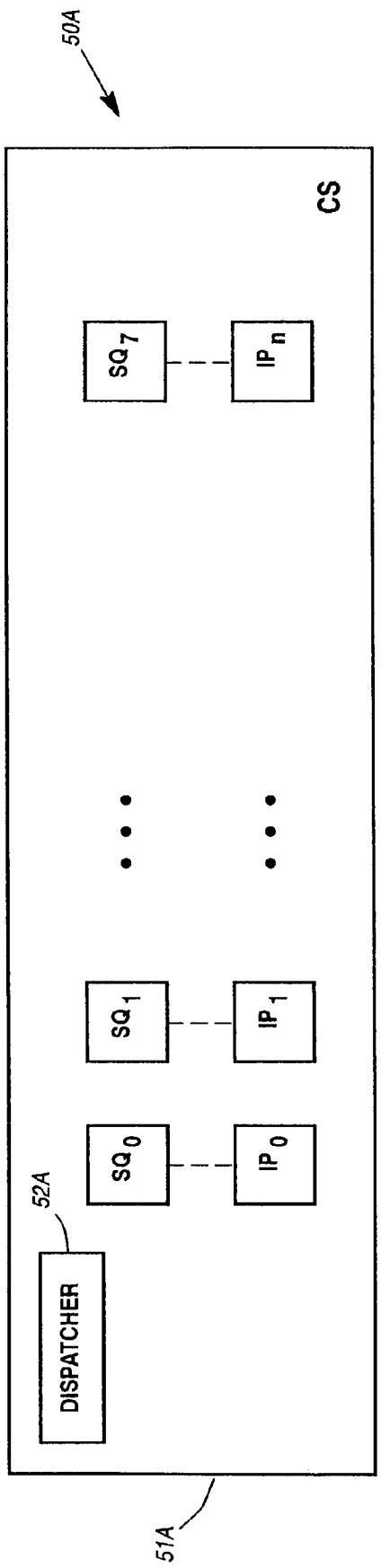
Figure 2B:
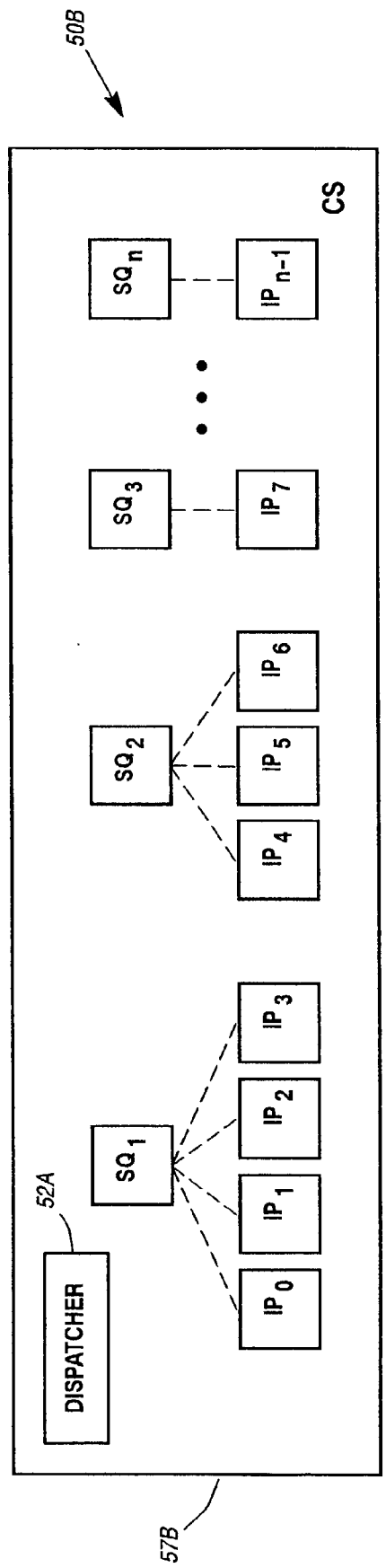

Turn now to FIGS. 2A and 2B, in which highly simplified conceptual models of computer systems are illustrated in diagrams 50A and 50B, respectively. (We will refer to FIG. 2C later for the discussion of virtual queue embodiments.) Inside computer system 51A there is a dispatcher program, usually a piece of re-entrant code, an instance of which runs each of the dispatcher queues (SQ0–SQx) to accomplish the tasks for the dispatcher queues. In computer system 51A, there is a single switching queue to each instruction processor. Thus, in this figure, there are n switching queues, SQ0–SQn–1. In computer system 57B, again all the dispatcher queues run the dispatcher 52A, but here there are asymmetries between the number of dispatcher queues and the instruction processors. Switching queue 1 (SQ1) has four IPs at its disposal, SQ2 has three, SQ3 has one, and SQx has one (IPn–1). Typically, it is more difficult to arrange the multiprocessor computer system into switching queues with differently-sized scopes, but it is possible. More typically, each switching queue will have a same number of IPs servicing it. This simplification makes the message a user needs to send to the operating system (called the "Exec" in Unisys CS7802 computer systems) simpler. Identifying merely the number of switching queues or their scope forces an automatic division of the processors. It is preferable too to order the split along natural dividing lines (i.e., neighborhoods) within the system. Thus, processors within a group that shares a bus and/or higher-level cache should be assigned to the same switching queue to take advantage of the inherent efficiencies available to such an organization in cache sharing and processor/cache communications simplicity.

It is convenient in some preferred embodiments to maintain a pair of tables that allow for easy allocation of switching queues to hardware configuration and tasks to switching queues. In FIGS. 4A and 4B such tables are illustrated. In the table of FIG. 4A, the first column identifies the IPs by number, 0–15 in the sixteen processor system. The bus neighborhoods are defined in the second column, and there are buses 0–7, each having two processors. The third column identifies which bus neighborhoods and processors correspond to which processors, and there are four TLC neighborhoods, 0–3. A TLC neighborhood identifies a Sub-Pod. The Pod neighborhoods, of which there are two, Pod0, and Pod1 in a 16-processor system are identified in the next column.

The switching queues are identified by number in the right side of the table of FIG. 4A. They correspond to Pod neighborhoods (SQ0, SQ1) and SubPod/TLC neighborhoods SQ2–SQ5, bus neighborhoods (SQ6–SQ13) and processor switching queues (SQ14–SQ29). Broken down in this way, with 29 switching queues provides for an easy way to manage switching queues. On a machine with this table, one could designate for examples, SQ0 and any combination of switching queues from the bottom half of the table to fill the processor resources, but one could not use SQ2, SQ3, SQ6–9 or SQ14–21, because they overlap on the resources designated for SQ0.

With reference to the computer system of FIG. 1, this set of efficiencies becomes apparent. Any four IPs that share a TLC (a SubPod neighborhood) will be better suited to sharing a switching queue because they share the same TLC and will reuse code and data from the shared TLC rather than getting it from an MSU or other TLC in many instances. This becomes even more likely as the user dedicates particular tasks that share the same data resources to a switching queue using this TLC. Thus, while it is possible to split up the assignment of adjacent IPs across switching queues, it is not recommended. Therefore we have focused on various methodologies for ensuring that even with some enhanced user control, the more efficient allocation of switching queues will be adopted on our computer systems.

The table of FIG. 4B is an example record of tasks and RUNIDs identified to specific switching queue as numbered in FIG. 4A.

Tailored Scope Queues—Initial Embodiment

In the initial embodiment, we allow a computer system administrator (a user) to control the number of IPs servicing a switching queue.

Therefore, we produced a new dynamic configuration parameter which we gave a static name "SWQAFFLVL" as a mnemonic for "switching queue affinity level." SWQAFFLVL is defined as a user addressable parameter that specifies the affinity level desired for a dispatching queue. In the preferred embodiment the allowable values are:

0— a queue per IP
1— a queue per bus
2— a queue per SubPod
3— a queue per Pod
4— a queue per system The lower the affinity number, the greater the improvement in the multi-processing (MP) factor because data is shared across smaller cache neighborhoods with higher performance.

(The system can have up to four Pods in our current computer system designs, but it should be recognized that in other computer systems different, analogous IP/memory architectures of larger or smaller sizes as well should be able to take advantages of the teachings provided herein).

These SWQAFFLVL values are based on the current Unisys hardware and the number of processors at a given level may change in the future because of a different hardware organization. A similar parameter can be used with alternate hardware architectures as one of ordinary skill in this field will easily appreciate. Also, multiple SWQAFFVL parameters may be used to enhance flexibility and provide for various sized groups of processors handling various sized loads simultaneously, as one of ordinary skill in this art can easily appreciate. In our initial embodiment we use only one SWQAFFVL parameter for simplicity.

The user's SWQAFFLVL changes only take effect on a reboot in current systems, but as per earlier discussion, it is possible to configure the operating system to handle on-the-fly changes to the sizes and number of switching queues using this invention. The system will be released with this configuration parameter set to 0 (zero) as the default because that provides the best performance for most environments that do not need to rigorously enforce preemptive priority. In the initial embodiment then, the user who needs preemptive priority will modify the SWQAFFLVL parameter, to say 2 (SubPod),to modify the number of switching queues, and this modification will take place on reboot. In other preferred embodiments, the user will send a message to the operating system with the request to modify SWQAFFLVL and the OS will handle the change, cutting over the switching queues as needed and handling the extant queues as described in the later section on the Dynamic Configuration of Tailored Scope Queues.

Priority—Virtual Queue

The second, virtual queue design employs an additional virtual queue for the range of task priorities that are being used explicitly within an application. (Typically, the range would encompass the highest application priorities in the system but this is not essential.) The "Application" could be all the threads in a run, or any other group of tasks as a user may wish to aggregate or otherwise organize them. Instead of having a physical queue that would result in contention, each processor in the system has its own queue (SQ0–SQn–1) and records the value of the highest priority within the range for the application whenever it updates the queue. The set of these values constitutes the "virtual queue 58, as shown in FIG. 2C. Whenever a processor has reason to look at its own switching queue for the next task to execute, it first looks at the priority values recorded by the other processors in the virtual queue. If one of those has a higher priority value, then it attempts to "pluck" the higher priority task from the other processor's switching queue and execute it.

"Plucking" involves locking the other processor's switching queue and finding and removing the highest priority task. (There are as many ways to lock a queue and find data on it as there are multiprocessor computer operating systems, at least, and these are known to those of ordinary skill in this art). If this is successful (i.e., a higher priority task is plucked from another processor's switching queue) then the Dispatcher dequeues the task from the other processor's queue and moves it to the processor that was looking for work and plucked it. The "looking" is a low overhead mechanism performed without a lock, so it is possible that some other processor may pluck the task first, in which case the processor can either ignore the task and continue dispatching from its own queue, or return to checking the virtual queue for another high priority task.

There can be various optimizations of the virtual queue design, both in further reducing the overheads of scanning the virtual queue and in preferring to pluck a task that is queued nearby (similar to the design we described for stealing in the Background above) where there is a choice of tasks needing processor resources at a given priority level. For example, in a large multi-processor system, it may be sufficient for each processor to scan only a subset of the processors, as described in the "Stealing" algorithm of the '023 patent application, relying on other processors to scan the remainder using a pre-set "buddy" system. The "buddy" system associates each processor with a buddy at each level of the cache hierarchy. For example, a processor has one buddy on the bus, another on the other bus within the SubPod, another on the pod's adjacent SubPod, etc. It only looks at these buddies, and always in order of closeness to itself. Each processor has a buddy list and each processor is in at least one other processor's list. In this manner, the overheads of looking and choosing are minimized.

Generally, if there are significant overheads required to access distant cache neighborhoods, then the subset of the processors that are scanned can be organized so that the processor that is looking for work will prefer to pluck tasks that are queued to processors that are in nearby cache neighborhoods and so reduce the performance impacts of loading the plucking processor's cache with the task's data.

This virtual queue design is also a trade-off of rigorous priority over performance, as the task would probably have executed more efficiently if left where it was. Unlike the first, tailored scope queues, a shared switching queue design, this virtual queue design is a complete solution without the need for dedication. (See more details about "dedication" below). In addition, it can operate with less overhead for an application that is dedicated to a cache neighborhood, as there is no need for a processor to look at the priority values for processors outside the neighborhood unless the neighborhood is allowed to execute non-dedicated tasks.

Figure 12:
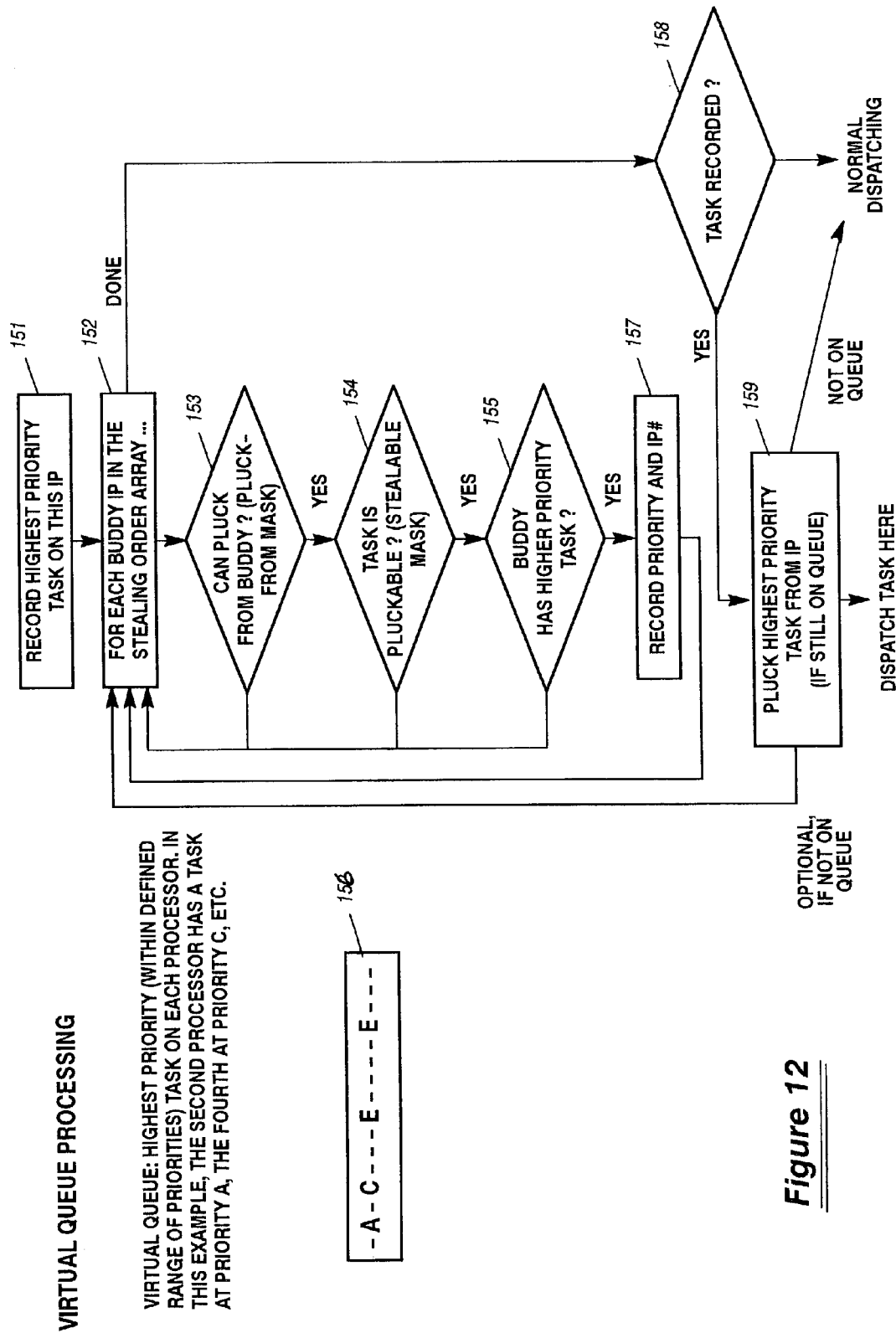
FIG. 12 is a flow chart of virtual queue processing using plucking.

FIG. 12 illustrates virtual queue processing with flowchart 150. Each time an IP Switching Queue (SQ) has a task put on its list, or at least each time one is added of higher priority than any existing tasks, the new task or tasks will be recorded 151 on the Virtual Queue. A simple mask or data matrix 156 is used at step 152 to show which tasks have highest priority on each of the processor's switching queues. In this example, sixteen processors have spaces allocated. Processor one (second from the left) has the highest priority task (an "A" level task), the next is processor three (fourth from the left), with a "C" level priority task, and two other processors have recorded tasks of priority "E" level with no other processors having recorded tasks. A processor when looking for a task will check for tasks on the virtual queue to determine if there is one of some priority listed and then attempt to take it from the processor on whose individual queue the task is also listed. One could develop a system where the processor looks to its own switching queue first and only take tasks of higher priority than those on that processor's switching queue, but we believe it more efficient to check the virtual queue first. The purpose of the Virtual Queue is to find the highest priority task in the system and the switching queues are ordered by priority. Therefore we only care about one task per IP. If that task is selected and dequeued then the next task on the IP's queue sets the priority value that goes into the Virtual Queue.

Based on whether or not under rules described elsewhere which define buddy processors and switching queue availability for plucking, a processor can pluck tasks from the identified processors with high priority tasks, the flow chart is followed through steps 153–155, and if under those rules it is acceptable it will attempt to take the task from the IP having the highest priority task. Also, (157 will only record if the buddy has a higher priority task, not one of equal priority, so if the original IP had a task of priority A and there were Bs and other As, then the only recording will be done in 151, and we'll select the original IP.) after the task is recorded 157, 158, the task is plucked from the switching queue of the processor that originally had it 159. If another processor has already taken the task from the switching queue then either the task is ignored and the processor continues, dispatching from its own switching queue, or the processor can revisit the virtual queue, looking for another high priority task.

(Although this "plucking" algorithm and the "stealing" algorithm previously described are described in terms of processor queues, i.e., the situation where each processor has its own queue, they can be generalized to handle processor groups. If the processors in a processor group share a switching queue, then a processor in the group becomes "idle" when the queue is empty and it may choose to steal work from the queue of another processor group that is busier than some threshold. It may also choose to pluck and execute the highest priority task that is queued to some other group instead of a lower priority task on its own group's queue.)

Data Sharing

The user determines which applications share data extensively based on their known design or based on instrumentation of the system. The user identifies each group of such applications to the OS by defining them as belonging to a Data-Sharing Group.

Data-Sharing Group

Figure 3:
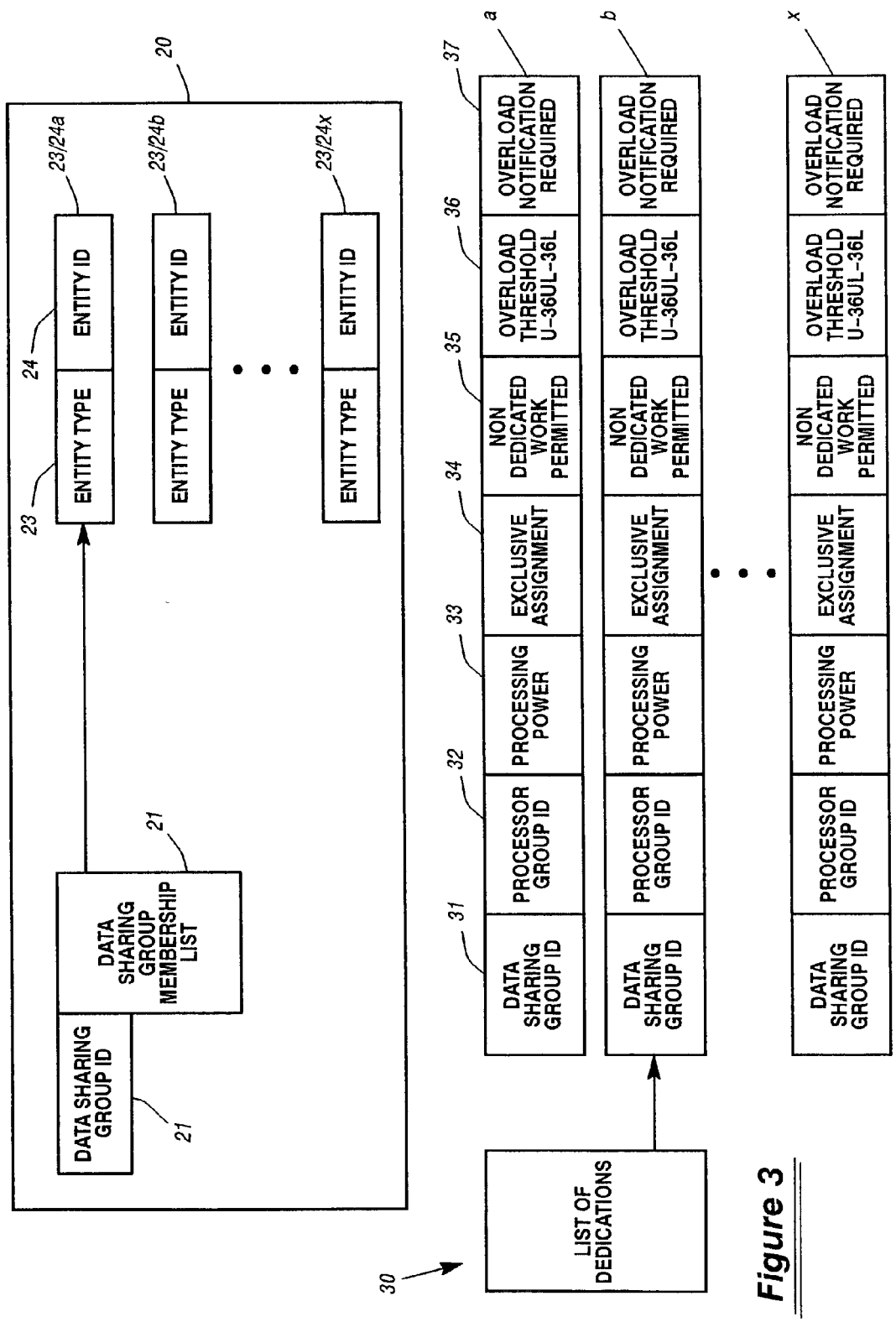
FIG. 3 is a block diagram of data structures which may be used by an operating system responsive to user dedication and switching queue assignment messages.

The parameters that define the declaration by a system administrator of data-sharing groups can be quite simple. They should preferably be able to fit into a single message the user can send to the operating system (OS). With reference to FIG. 3, a block of memory or a message 20 should have components including the data-sharing group ID 21, and a list 22 of software entities, having repeated entries of entity type 23 and entity ID 24. (A pair of entity type and entity ID is identified by a paired numeral 23/24a–x). In format, the message to the OS need merely contain the Data-sharing group ID and the Data-sharing group membership list, and the OS can look up the entity type and Entity ID from the pointers in the Data-sharing group list; or the message could contain all the information if preferred.

Additionally, the user will have to supply a list of dedications 30, such as is illustrated in FIG. 3, (unless he uses a default condition). Here, the list of messages 30 will describe the features of handling for each task or USERID or whatever dedication unit moniker is employed. When the user applies this list, the OS should have some kind of security check to determine that these dedications are permitted and authorized by/for the system administrator. In the preferred embodiment, the messages or units on the list have seven data components 31–37, and the list can be as long as needed. (a–x). An additional description of how this is used is found in the section below on Dedicating Data-Sharing Group(s) to Cache Neighborhoods, but a brief description of the data component parts follows.

With reference to FIG. 3, each of the messages a–x should have components including the data-sharing group ID 31, previously declared by the system administrator and an indication of the processing resources required. The resources can be expressed as Processor Group ID 32 that identifies the group of processors to which the work should be assigned. The resources can also be expressed as Processing Power parameter 33 that indicates the number of processors required for this particular Data Sharing Group (if the OS is to select a Processor Group based on the power required.). More than one data-sharing group can be dedicated to a processor group if sufficient processor power is available. The exclusive assignment indicator 34, if set, instructs the OS that no other data-sharing groups may dedicate to this processor group. The processor group is permitted, however, to execute tasks that have not been dedicated, if the "non-dedicated work permitted" indicator 35 is set.

This permission is subject to the Overload Thresholds 36L and 36U, as described by the state diagram in FIG. 10. In the event of an Overload condition, where dedicated tasks drive the processor group to a degree of busy-ness that exceeds the threshold 36U, the user (operations staff) can be notified according to the control 37.

The messages in the list are preferably ordered by the system administrator with the first assignments having precedence. The OS processes all the messages, even if some of the assignments cannot be satisfied because of resource conflicts or absences, or for other reasons. For example, the system may be running with fewer processors than normal, or the system may not have all the resources requested.

Data-Sharing Group—Initial Embodiment

In the initial basic embodiment, there is only one data-sharing group, so it is unnamed. It provides limited control for up to ten Batch/Demand run IDs (i.e. tasks or applications or parts or groups thereof as selected by a user) that the user can dedicate to a single processor group. The runs themselves are specified with a set of dynamic configuration parameters we call DEDICATED_RUNID1 through DEDICATED_RUNID10. These configuration parameters take effect when the parameter is changed. Tasks of RUNIDs currently executing are switched to the processor group as soon as possible. In the initial embodiment as soon as possible means when they next become candidates for execution. (See Dedication Process sections below for further information on this topic).

Data-Sharing Group—Preferred Embodiment

In the preferred embodiment, the user can define as many data-sharing groups as are required for various combinations of applications and the like. The data structures described in FIG. 3 would preferably be used to define these but any user interface that supports such data structures can be used.

In the system that is the preferred embodiment, probable entity types are Runs, Application Groups, and Subsystems. The performance of all these types can potentially benefit by being confined to a limited cache neighborhood. The Run type is valuable for large application programs with many control threads, all of which share data spaces. It may also be used for multiple Runs that share common data spaces. The Application Group type is useful to describe all the transactions that update a common shared data space. The Subsystem type describes shared code and data callable by many Runs or transactions.

Dedicating Data-Sharing Group(s) to Cache Neighborhoods

A user wishes to optimize the performance of the applications in the Data-Sharing Groups by dedicating the groups to the smallest, and hence the highest-performing, cache neighborhoods that can support the applications. (The highest-performing neighborhoods are those with the highest multi-processor factor.) To be more precise, the user actually dedicates the Data-Sharing group to the processor group that services the cache neighborhood. For each Data-Sharing group the user either names a specific processor group (identified in block 32 in FIG. 3, based on ID from FIG. 4 tables) or tells the OS the number of processors required (33 in FIG. 3) and the OS chooses the optimum processor group. Although the user will typically only request dedications for which there are sufficient processors available, the system may be running with a reduced configuration, so the user submits a list of dedications to the OS in order of precedence. Thus, in either manner, the user submits all the dedication requests he desires and the system accommodates those that it is capable of accomplishing. For example, if a User asks for an 8-way (that is, an eight processor neighborhood) dedication and a 4-way dedication and the system has 11 processors, what happens depends on how the processors are arranged. If there is an 8-way Pod with a missing processor and a separate, complete 4-way SubPod then the 4-way application dedication would be allocated to the SubPod and the other would run non-dedicated either across all 11 processors or the remaining 7 processors of the 8-way Pod, depending on whether the 4-way definition allows non-dedicated work. If there is a full 8-way pod, then the 8-way dedication would be successful and the 4-way dedication would fail and would run non-dedicated unless the user requested the 4-way dedication have higher precedence.

As can be seen in the data structures 32 and 33, two methods of assignment are available in the preferred embodiments, one where the user explicitly specifies processor groups and one, more automated, where the user specifies the processor power needed and the system chooses the processor groups.

Explicit Dedication to a Processor Group

With the explicit specification method, the size of the processor groups is defined by the SWQAFFLVL parameter defined above (Section on Tailored Scope Queues—Initial Embodiment). For each data-sharing group, the user specifies which processor group is to be used by naming one of the processors in that processor group (32). For example, with SWQAFFLVL set to 2 (meaning one queue per 4 processor SubPod), a data-sharing group nominating processor 8 would be dedicated to the four processors 8, 9, 10, and 11, i.e., the processor group for the SubPod. The user is notified if an assignment cannot be satisfied, for example, if the processor group's processors are not available. The data-sharing group, preferably after an OS system notice to the user, then runs non-dedicated. In preferred embodiments it is the user's responsibility to submit an alternative assignment, although the OS could wait and recheck for more satisfactory conditions if desired.

Automated Dedication to a Processor Group

In the automated method, the user specifies the processing power required by a data-sharing group, and this power parameter is used by the OS to decide the size of the processor group that is required, and to pick one. For example, a data-sharing group that requires 6 processors, running on a system that has 1, 2, 4, and 8 processor cache neighborhoods would be assigned to an 8 processor group. If the next request is for 3 processors for another data-sharing group then it would be assigned to a 4 processor group. With this method, processor groups can be different sizes to match the user's application needs. The SWQAFFLVL parameter would still apply, but only to processors that are not part of one of the assigned processor groups. The expectation is that the parameter would be set to 0 (a queue per processor) but not necessarily so. If an assignment cannot be satisfied then the user is notified and the data-sharing group will run non-dedicated. As with explicit dedication, either the user may choose to change the assignment messages, (for example to reduce the number of processors requested, and resubmit the messages), or the OS can support the dedication on the occurrence of acceptable conditions.

Dedicated tasks may only execute within the confines of the assigned processor group. This is why we chose to call this dedication. Preferably, the tasks are tagged with a mask of master bits, described in FIG. 10, one bit per possible processor in the system's design, that indicates which processors may execute the task. Tasks are initially queued to a switching queue that is serviced by one of the allowed processors. The tasks are kept within the confines of the processor group by restricting the "stealing" and "plucking" of the tasks. No processor outside the group may steal or pluck a dedicated task, though the processors inside the group may steal from each other's queues to maintain a balanced load or pluck from each other's queues to honor the user's needs for preemptive priority.

Disposition of Non-dedicated Tasks

With both methods of dedication, non-dedicated tasks may run on any processor, subject to any limitations 35 (FIG. 3) specified by the user when dedicating data-sharing groups. Non-dedicated tasks are those that are either not part of a data-sharing group or are part of a data-sharing group that has not been dedicated to a processor group. The user can prevent an assigned processor group from running non-dedicated tasks using the "non-dedicated work permitted" indicator 35. If allowed by the "non-dedicated work permitted" indicator 35, the processors can take on non-dedicated work either through the round robin selection when tasks are created or through stealing from other queues.

Idle processors that are not in an assigned processor group can steal non-dedicated work at any time. Idle processors within an assigned processor group can steal any work from each other and can steal non-dedicated work from processors outside the group subject to the controls in 35 and 36. The user can control the performance effects of the dedication and any interference from the execution of non-dedicated tasks with the overload thresholds 36. These include an upper threshold 36U and a lower threshold 36L. (Values are set for these thresholds in accord with the user's understanding of the system. For example, an upper threshold of 95% busy and a lower threshold of 50% busy might be a setting, but the values used internally could be in terms of operations per fraction of a second or clock cycle if those are the kinds of data the computer system housekeeping functions records.)

Figure 8:
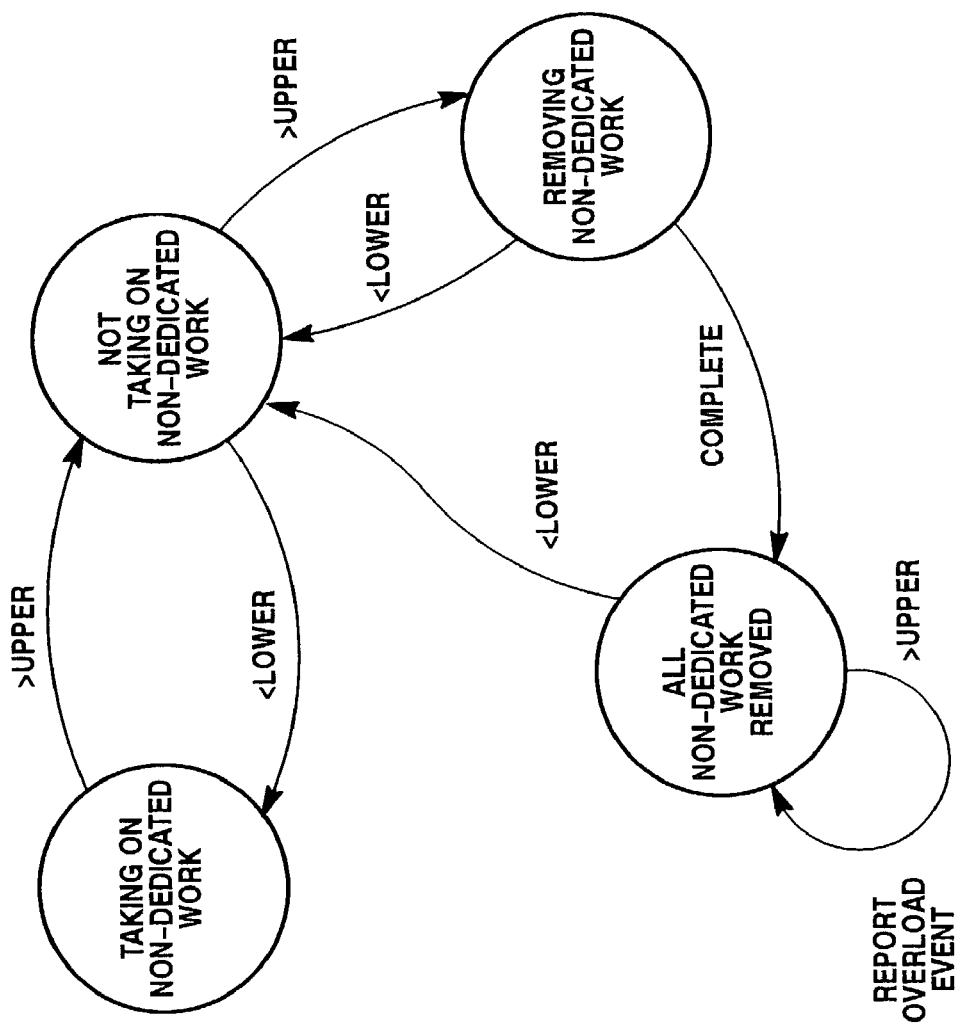
FIG. 8 is a state diagram describing the process of controlling the performance effects of executing non-dedicated work within an assigned cache neighborhood.

As shown in the state diagram in FIG. 8, if the processor group is taking on non-dedicated work and it becomes busier than the upper threshold 36U then it stops taking on that work. It will resume taking on work if the processor group becomes less busy then the lower threshold. If the upper threshold 36U is exceeded again even though no work is being taken on, then the processor group dequeues all non-dedicated work and redistributes it to the other eligible dispatching queues, so that it is only doing dedicated work. Thereafter, dropping below the lower threshold 36L causes it to begin taking on non-dedicated work again.

Overloading of Processor Groups

Although dedication to a cache neighborhood can improve performance of a task, there is a risk that the cache neighborhood will become overloaded. For example, the user may have dedicated the data-sharing group to a processor group that has enough capacity, but the processor group may become overloaded due to additional application load or the failure of a processor. The user can set thresholds to detect overload conditions and take appropriate action. (Overload conditions are determined by housekeeping and monitoring functions of the OS which are common in many large computer systems. These functions can be adapted to provide data on the busyness parameters when selected within the ordinary skill of those in this field.) If the processor group becomes busier than the upper threshold 36U and is not processing any non-dedicated work, then the user is notified of the overload event as required by 37. The user can choose to modify the data-sharing group definitions or the assignment list in response to the event. For example, the assignment list could be modified so that a Data Sharing Group now specifies a larger cache neighborhood, or so that two Data Sharing Groups that shared a cache neighborhood are now assigned to separate neighborhoods, or some subset of tasks can be removed from the dedication list. This response can be automated by an auto-answering message system built into the OS itself to handle circumstances where such an overload is an anticipated event.

Dedication Process—Initial Embodiment

In the initial embodiment, there is only one, unnamed, data-sharing group, and the group is automatically assigned to the default processor group; that with the highest numbered processor in the configuration. As I/O interrupts are directed to the lowest numbered processors on these systems, this enables the data-sharing group and its dedicated tasks to avoid the load caused by I/O interrupt processing. The number of processors in the processor group is governed by the SWQAFFLVL parameter. If this is set to 2, for example, the data-sharing group will run in the highest numbered SubPod, and I/O interrupts will be handled by the lowest numbered SubPod.

The runs specified by the DEDICATED-RUNID parameters will be executed using the processor group with the highest numbered IP at the time the parameter is modified. Using the processor group with the highest IP number reduces the impact from I/O interrupts in the inventors' computer systems, and application of this invention to other computer systems may use different IP numbers for various reasons including avoiding I/O processing on dedicated processor groups. Having removed the load of I/O interrupts, the runs the user dedicates to the highest numbered processor group will be the only runs to execute using those processors.

Dedication—Example of Initial Embodiment

Figure 5A:
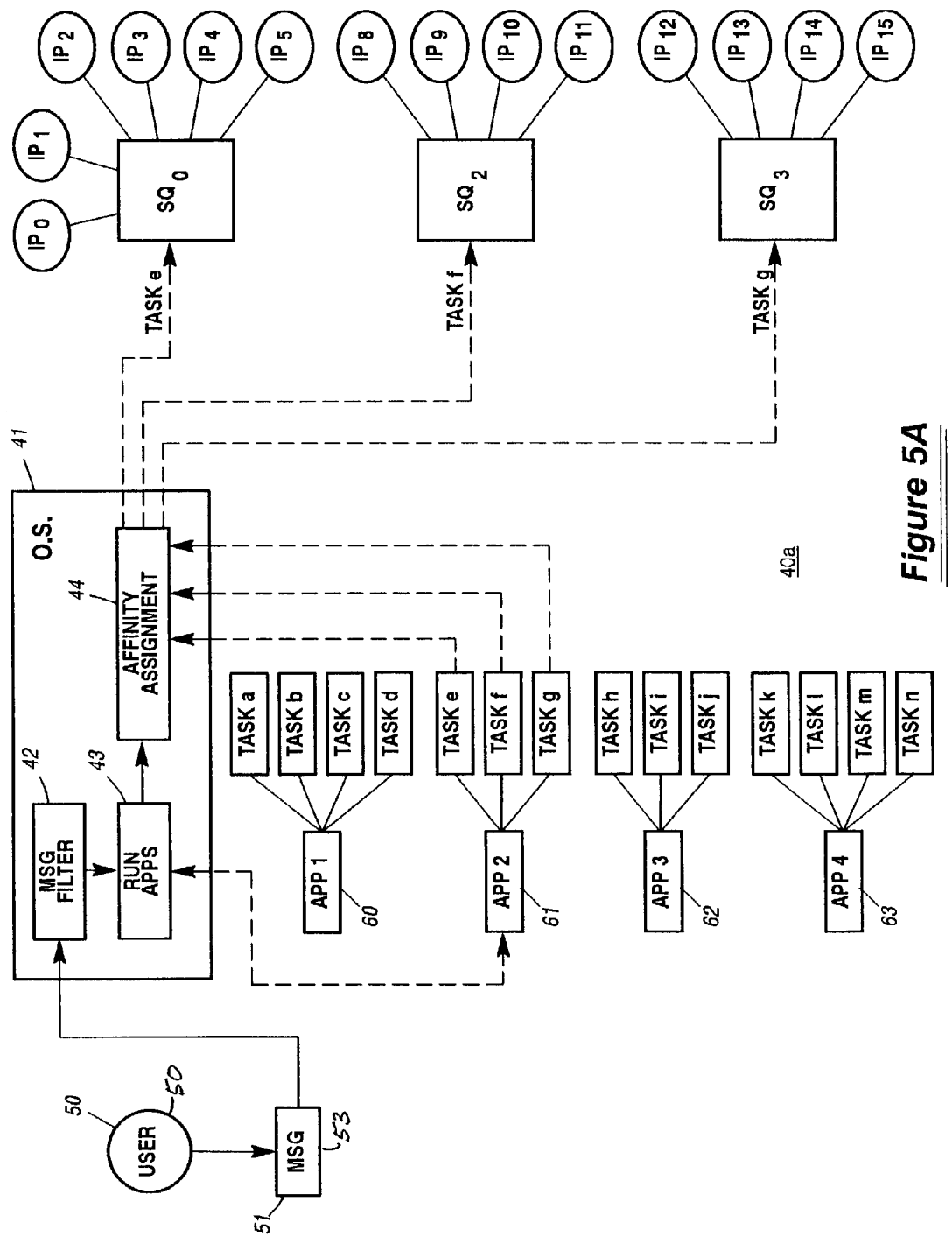
FIGS. 5A and 5B are a heuristic logical component diagrams illustrating the logical components of preferred forms of the invention.
Figure 5B:
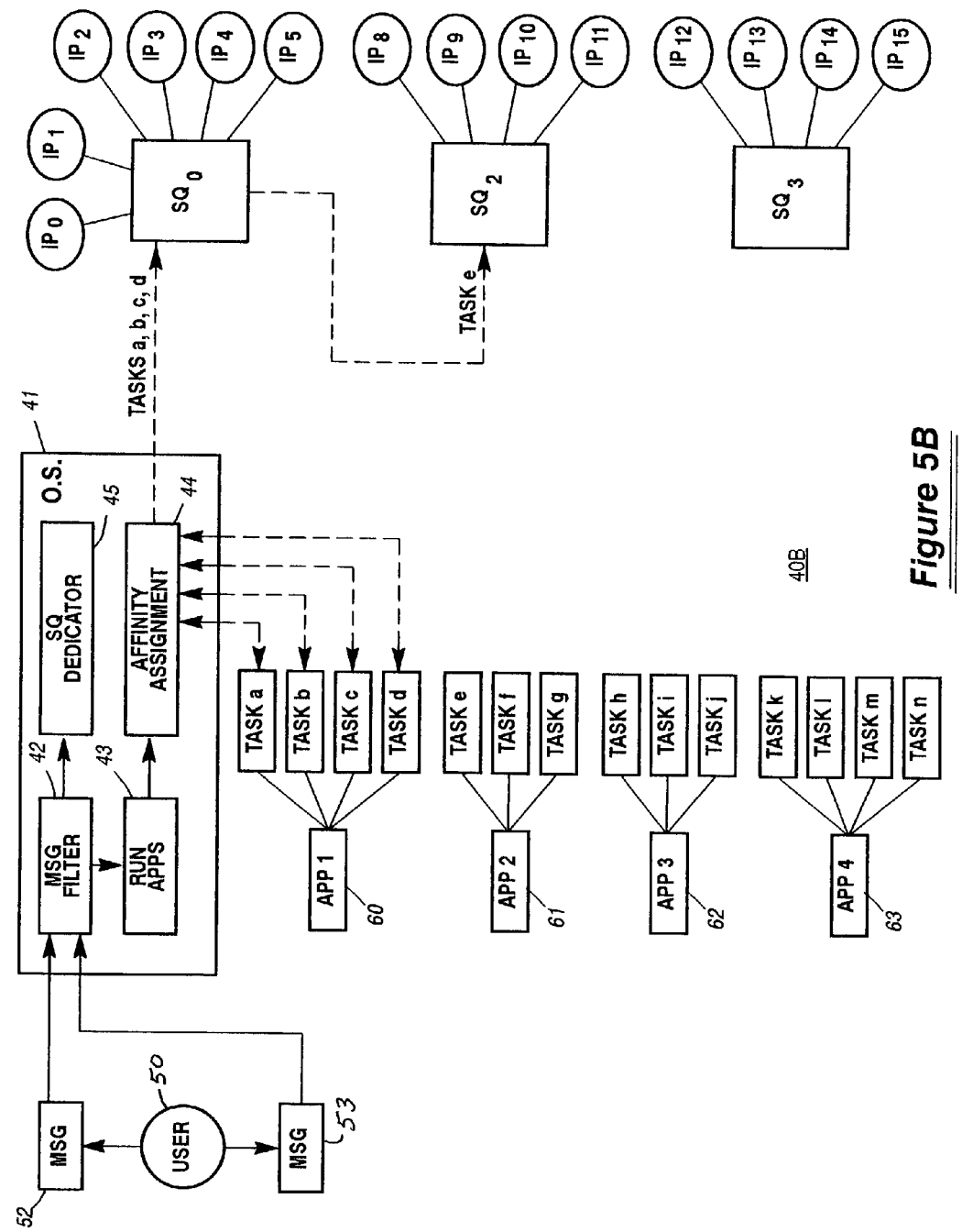

Refer now to FIG. 5A, a first stage in the two-stage description when taken together with FIG. 5B to describe the functioning of the system. Initially in FIG. 5A, without any dedication assignments, the system 40A exhibits an operating system (OS) 41 having at least the security check 42, application run handler 43, and affinity assignment block 44 available to the system, and likely in main or disk memories are applications APP1–4, 60–63, respectively. The hardware is configured into three switching queues, SQ0, SQ2, and SQ3. SQ0 has six IPs, SQ2 has four IPs and SQ3 has four IPs. As mentioned previously, typical configurations will have a uniform number of IPs per switching queue, but it is reasonable to allocate the IPs in other ways such as is illustrated with respect to system 40A.

A user 50, who wants to run an application APP2 61, will send a message 51 to the operating system 41, which will direct the message to the security check 42. The security check will, if the message is appropriate, direct the RUN APP function 43 to get and run the application. The application will spawn several tasks, here TASKe, TASKf and TASKg. The RUN APP function will also have identified this application APP2 61 to the AFFINITY ASSIGNMENT function 44, which will assign the affinity of these tasks to the various processors in accordance with the round-robin mechanisms. In this heuristic example without the dedication being used, this could have meant that TASKe was assigned to Switching Queue SQ0, TASKf to SQ2 and TASKg to SQ3. In the inventors' systems an identical dispatcher is used by all switching queues, but that is not important for the functioning of this invention. Each could have an unique dispatcher if desired.

In FIG. 5B the time is shortly later than in FIG. 5A, and the system is called 40B. The system administrator 50 wants to use dedication to dedicate a single application APP1 60 to a processor group. The system administrator preferably sends a first message 52 to the security check 42 defining a data-sharing group DSG1 with a single member APP1, and then a second message 53 to the security check after the request to dedicate data-sharing group DSG1 to processor group SQ0, and to give data-sharing group DSG1 exclusive use of SQ0. Thus tasks a, b, c, and d will be dedicated to SQ0 as they seek IP resources, and task e will be reassigned to SQ2.

Once this dedication has happened, any request message to run the application APP1 60 will cause a dedicator function 45 within the operating system 41 carrying the identification information from message 30 (FIG. 3). This information is incorporated into the AFFINITY ASSIGNMENT function 44, so that when the message to run APP1 60 is sent by the RUN APP function 43 to the AFFINITY ASSIGNMENT function 44, all of the tasks spawned by program APP1 60 are assigned to switching queue SQ0. Additionally, in the preferred embodiments, non-dedicated tasks already on the switching queue in switching queue 0 (SQ0) will be moved to one of the other switching queues SQ2 and SQ3. This move can be done with additional code within the switching queue's management code, preferably. Alternatively the operating system can handle it by a routine in the AFFINITY ASSIGNMENT function. The sending of the messages 52 and 53 should alter the functioning of the AFFINITY ASSIGNMENT function to send all tasks from the identified application to the identified switching queue, and any other tasks to other switching queues.

Dedication Process—Preferred Embodiments

In the preferred embodiments, the dedication process involves the application of a user-supplied dedication list (30 in FIG. 3) against the user's system configuration. As a result of that process, the OS builds a set of controls that govern the execution of tasks, the treatment of priority, and the scope of load balancing. Where the handling of priority is based on the tailored-scope queue design, the controls are queues specifically built to handle the dedications. Where priority is handled by a virtual queue design, the controls are masks, wherein each processor is assigned an array position within the mask. Note that with the virtual queue design for dedication the actual use of the virtual queue and the plucking the highest priority tasks are optional. If the user's applications function well with the limitations of non-preemptive and processor-local priority then the user can dedicate tasks but disable the virtual queue.

Dedication Process—Preferred Embodiments—Tailored Scope Switching Queues

Figure 13:
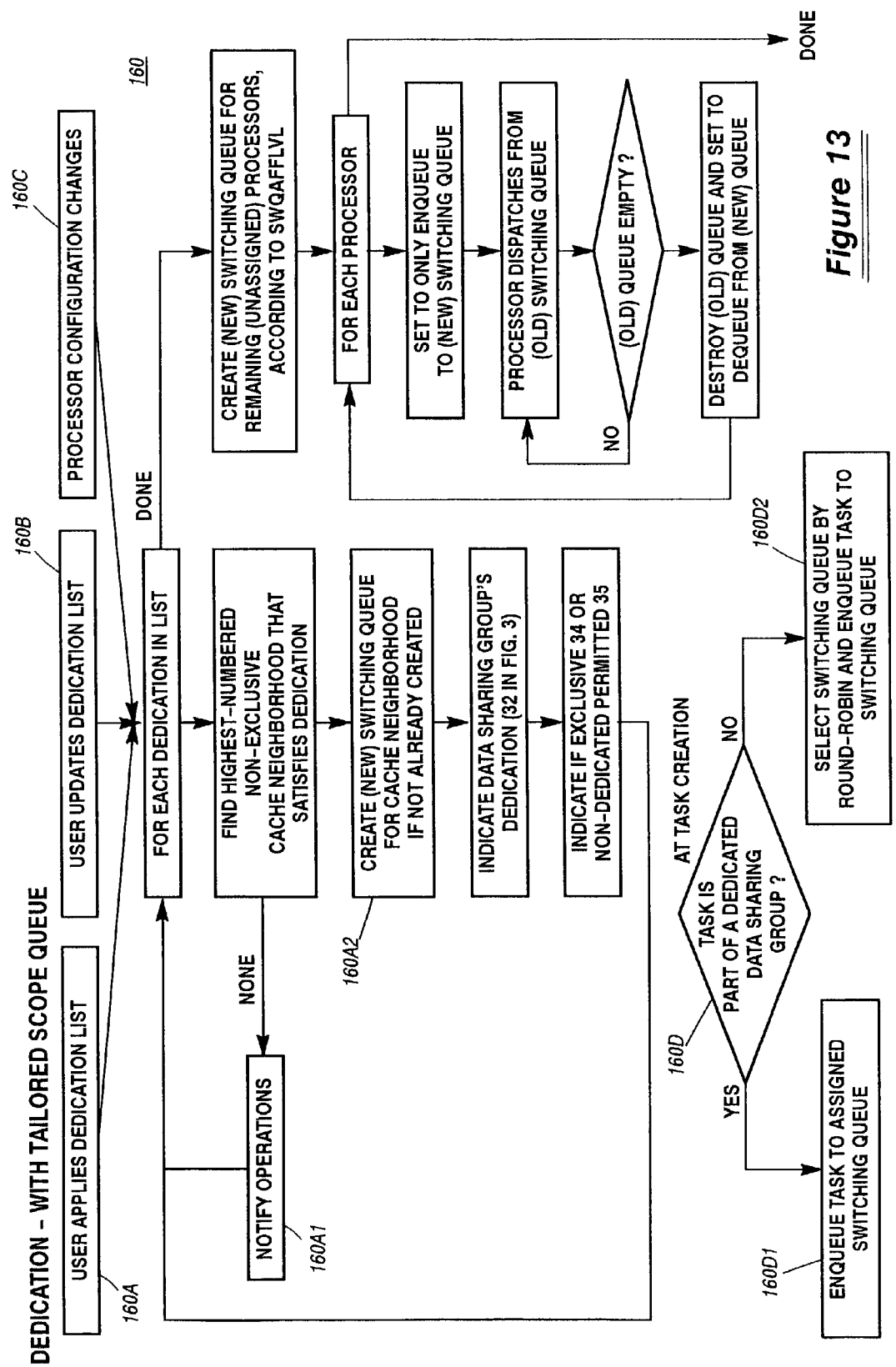
FIG. 13 is a flow chart showing the dispatcher's actions in a system that supports dedication with tailored-scope queues.

FIG. 13 is a flowchart of how the dedication list (again, FIG. 3, item 30) is used to generate the tailored-scope switching queues for the assigned cache neighborhoods, and for those that handle non-dedicated tasks. The flowchart 160 is applicable either to the initial application of the dedication list 160A, or to any subsequent change 160B or 160C, so it also shows the dequeuing of tasks from the previous queues and their enqueuing to new ones created. Finally in 160D it addresses the initial assignment of a newly created task to either the switching queue its Data Sharing Group is dedicated 160D1, or to one of the unassigned switching queues 160D2. The flowchart does not show the Dispatcher's actions in processing a solitary one of these switching queues, as handling of a single priority-based queue by multiple processors with some kind of inherent load balancing is well understood in the industry. Note that the step "notify operations" 160A1 is an indication to the operations staff that the dedication has been unsuccessful. Also in block 160A2, if there is a non-exclusive dedication, an OS can permit more than one Data Sharing Group to be dedicated to a single Cache Neighborhood and switching queue. The remainder of the figure is self explanatory.

Dedication Process—Preferred Embodiments—Virtual Queue Design

Figure 9:
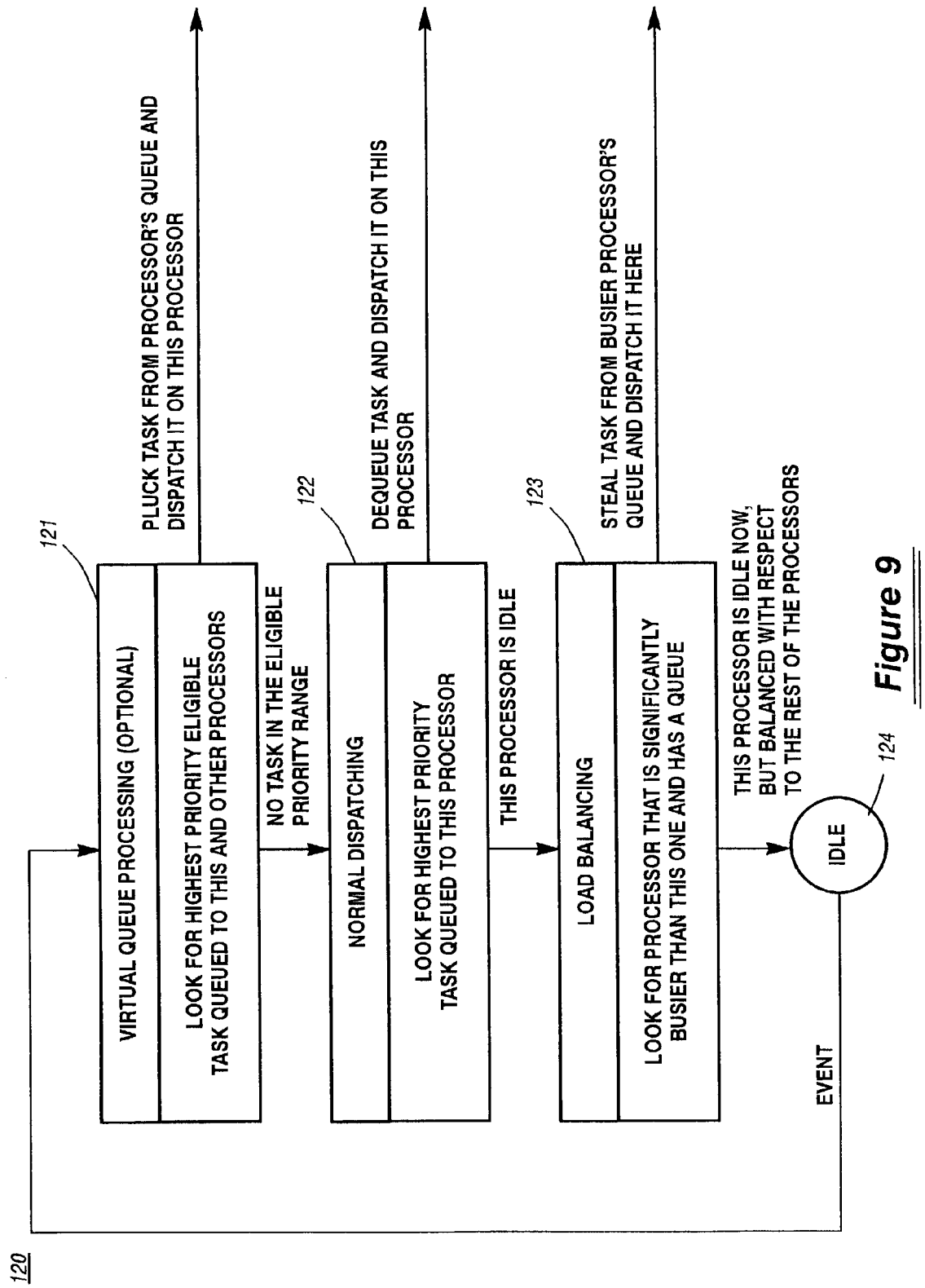
FIG. 9 is a flow chart showing the relationship of plucking and stealing to normal dispatching.
Figure 14:
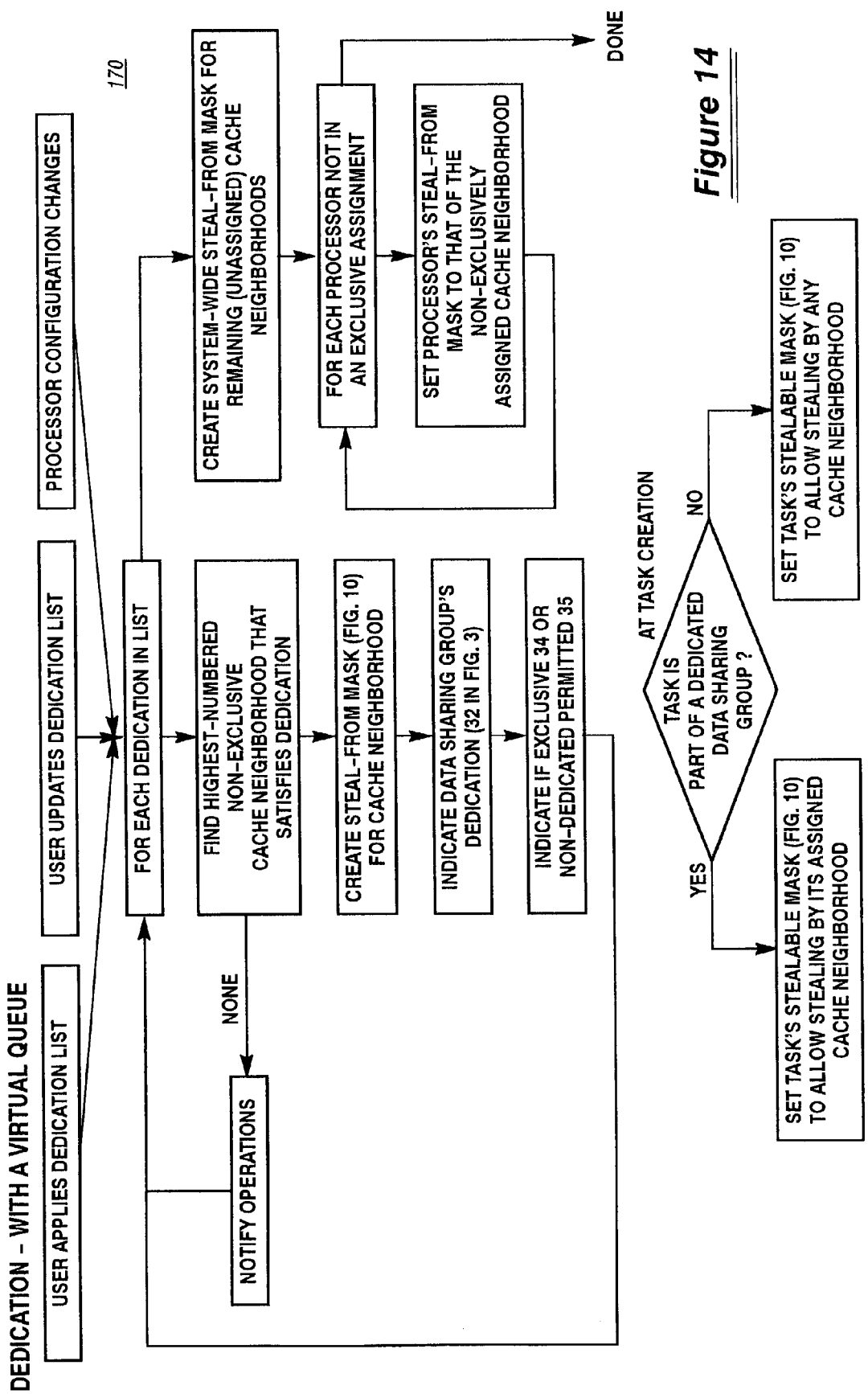
FIG. 14 is a flow chart showing the dispatcher's actions in a system that supports dedication with a virtual queue.

The flowchart 170 of FIG. 14 has a similar flowchart structure to that of FIG. 13, however it handles the priority requirements with a virtual queue rather than creating new switching queues for cache neighborhoods. The chart shows how the dedication list is used in the Virtual Queue design to generate steal-from/pluck-from masks for the processors and stealable/pluckable masks for the tasks. For this design, the Dispatcher actions are shown in some detail, as the dedication of a data sharing group to a processor group has implications on both virtual queue processing (for systems that support preemptive priority) and on load balancing. The relationship between these functions is illustrated in the flow chart 120 of FIG. 9, which describes the processing that occurs when a processor is looking for work to do. In FIG. 9, four Dispatcher states are illustrated with three active states 121, 122, and 123, and an idle state 124. An instruction processor will always be in one of these processing states unless it is actually executing a task. Transitions from states 121, 122, 124 and 124 occur as indicated. For example, if a virtual queue processing state 121 exists when a processor finds no task eligible in the priority range on the virtual queue, it transitions to a state 122 or 123 or 124, in the illustrated sequence.

Thus, for support of preemptive priority (an option), the processor must first look for and "pluck" the highest priority eligible task queued to any processor. This Virtual Queue Processing 121 is described in detail below. If there are no such eligible tasks, then the processor looks for the highest priority task on its own switching queue 122, and executes that task. If there is no task on the queue, then the processor is in idle state 124. However, if a Load Balancing algorithm 123 is available, the processor looks for another processor that is significantly busier (on average) and that has a queue of tasks ready for execution. If it finds such a processor, it will "steal" the highest priority task and execute it, as described in detail below or else it will transition to idle state 124.

The control information for virtual queue processing (plucking) and load balancing (stealing) is shown in FIG. 10. The controls are shown as conceptual array, with the first array element describing state for IP0, the second for IP1, etc. In the preferred embodiment, these arrays are implemented as bit maps within a 36-bit word for efficiency, but many other implementations are possible.

A stealing order array, one per processor, described conceptually in the Ser. No. 09/920,023 patent application incorporated herein by this reference. We still prefer to use this concept to determine which other processors this one should look at (its "buddies") and the order in which it should look at them. An example is array 131, showing stealing order relative to one of sixteen processors in an example computer system. The array is used to limit the overheads of both the Virtual Queue Processing and Load Balancing algorithms.

The steal-from mask, also known as the pluck-from mask, (examples illustrated as masks 132–134) one per processor, indicates which other processors this one is allowed to steal (or pluck) from. The masks are related. Array or masks 132–4 express permissions; in other words, whether one IP can pluck/steal from another IP. Mask 131 describes a preferred order to look at them (for efficiency). In a system without any dedications (as one having mask 132), this would be set to allow any processor to steal from any other, with the stealing order established by the stealing order mask, unique to each processor. However, if this processor is assigned to be part of a dedication that does not permit the execution of non-dedicated work, then the mask will indicate that the processor may only steal or pluck within the confines of the dedication. The mask 133 is an example of the mask for a processor that is a member of an assigned SubPod that is not allowed to do undedicated work. This mask only allows it to pluck or steal from the four processors within the SubPod.

Each task in the system is also given a "stealability" mask. For a non-dedicated task, this mask (like mask 135) would be set to allow any processor to steal or pluck it. For a dedicated task, only those processors within the scope of the dedication are allowed to steal or pluck it (example, mask 136 only allows the last four processors to steal this task.

The Virtual Queue processing proceeds according to the flowchart in FIG. 12. Each processor is required to record its highest priority queued task (within the defined range of priorities, typically those known as "real-time"). In the example shown in 156 in FIG. 12, only 4 processors have queued tasks within the defined range. A processor looking for the highest priority task to dispatch first looks at the other processors according to the order in the stealing order array 156. Driven by the masks described above, it only looks at processors that it is allowed to pluck from and only considers tasks that it may pluck.

If it finds such a task and the task has higher priority than any on its own queue, then it will pluck the task from the other processor (i.e., dequeue it from the other processor's queue) and execute the task. Note that, for performance reasons, the search for the task is performed without a lock, so it is possible that some other processor will pluck this task, so this processor's plucking will fail, causing the Virtual Queue processing to be repeated. If there is no pluckable task, then the processor will service its own queues according to normal dispatching algorithms.

Figure 11:
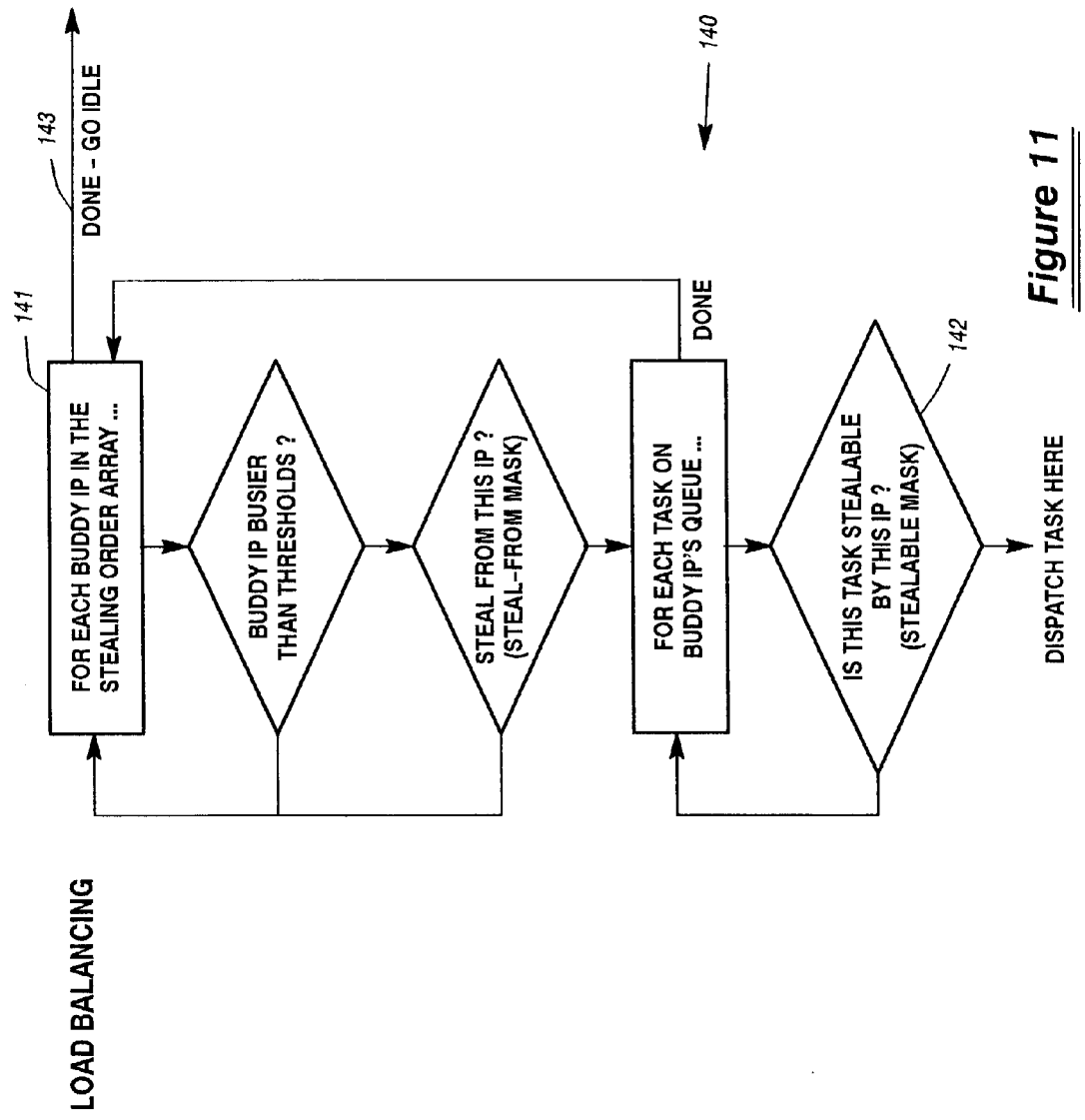
FIG. 11 is a flow chart illustrating a load balancing process using stealing.

A load balancing mechanism was described in the earlier referenced Ser. No. 09/020,023 patent application incorporated herein by this reference, but modification is required to handle the dedication of tasks. FIG. 11's flowchart 140 shows how an idle processor uses the steal-from mask to determine whether it is permitted to steal work from the processors in the stealing-order array. It starts by checking each buddy IP 141 and proceeds until it finds a task 142 or goes idle 143. For example, if an Instruction Processor is assigned to be part of a dedication that does not permit the execution of non-dedicated work then the steal-from mask will only permit stealing within the scope of the dedication. One additional check is also necessary. When selecting a task from the stolen-from processor's queue, the stealing processor must find the highest priority task that is allowed to be stolen by this processor. For example, the stealing processor must not be allowed to steal dedicated tasks if it is not part of the dedication. A check against the stealable mask of the task provides the needed information.

Dynamic Configuration Responsive to User's System Configuration and/or User's Application Mix (Terms from Background Chart)

The dedication of data-sharing groups to switching queues must be reevaluated automatically whenever the processor configuration is reduced or when the user applies the list of data-sharing group dedication requests, and this should be done by the OS routine responding to the change in configuration. The user may reapply the dedication list 25 (from FIG. 3) either to match a hardware configuration or because the list has been changed to reflect an operational or application change. The action may also be automated to occur at some specific time of day or when a particular task finishes or starts.

The list of dedication messages is ordered, with the most important messages first, and a list is always submitted in its entirety, because the OS will use it to replace the previous list. The results of reapplying the list may range from no changes at all to the queues, to a complete restructuring. In principle, a completely new set of switching queues is generated to match the switching queues that are required to satisfy the data-sharing groups' dedications. The dispatching algorithms begin using these new switching queues for the tasks that are currently executing, all newly created tasks, and those that had previously been waiting on other resource queues. Tasks on the prior queues are moved to the new queues, based on the new dedications. Once a queue is emptied of tasks, the emptied queues are discarded. Any embodiment of the invention can choose to accelerate this queue replacement process by recognizing when a queue change is minor and simply re-naming or re-assigning a queue, but such accelerations are neither required nor forbidden in accord with our invention.

Dynamic Configuration—Initial Embodiment

The parameters discussed above (SWQAFFLVL and DEDICATED_RUNIDx) and the alternative data-sharing group definition 20 and assignment list 25 in FIG. 3 can be modified at any time. When one of the parameters is modified, the system re-evaluates what queue should be used for processing the dedicated runs. If there are not at least 2 switching queues with "UP" (that is, running) IPs, the update will be rejected, and all memory copies of the dedicated RUNIDs will be cleared to spaces to indicate that there are no dedicated runs. This will also occur if a dynamic DN (change of the IP state from running to not-running) of an IP results in only 1 switching queue. The dynamic DN of an IP that results in a new switching queue having no IPs to process it when there are still at least 2 switching queues will result in the operating system re-evaluating what queues should be used for processing the dedicated runs. The dynamic UP (change of the IP state from not-running to running) of an IP will not cause the reevaluation of dedicated run processing. Resetting one of the DEDICATED_RUNIDx parameters will cause the re-evaluation after the dynamic UP if this UP was done to provide a better environment for the dedicated runs.

Dynamic Configuration—Initial Embodiment Example

In the initial embodiment, there is only one data-sharing group (defined by the DEDICATED_RUNIDx parameters) and one size of switching queue (set by SWQAFFLVL). The data-sharing group is dedicated to the highest numbered switching queue, and the assignment is exclusive and does not permit the execution of non-dedicated tasks. All remaining tasks run in the lower numbered switching queues. This is a much simpler environment as the number and size of the switching queues can only be changed at reboot time, but the reevaluation principles are the same as for the preferred embodiment.

The configuration is reevaluated whenever the last processor of a switching queue is removed or a DEDICATED_RUNIDx is modified. If a processor is added then the system waits for the user to change or reaffirm a DEDICATED_RUNIDx before reevaluating the configuration.

Figure 7B:
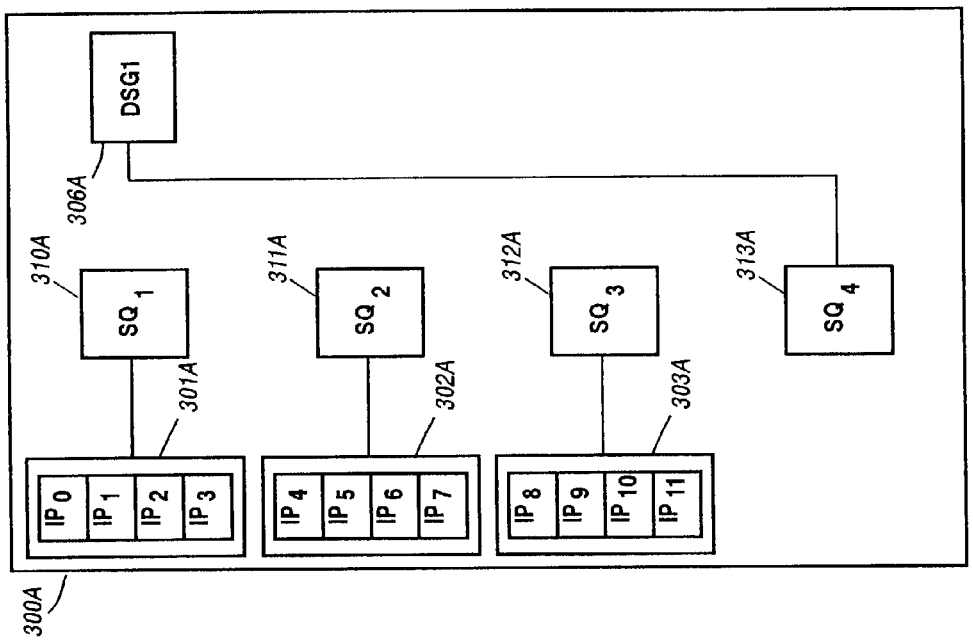
FIGS. 7A and 7B are dynamic configuration block diagrams.
Figure 7A:
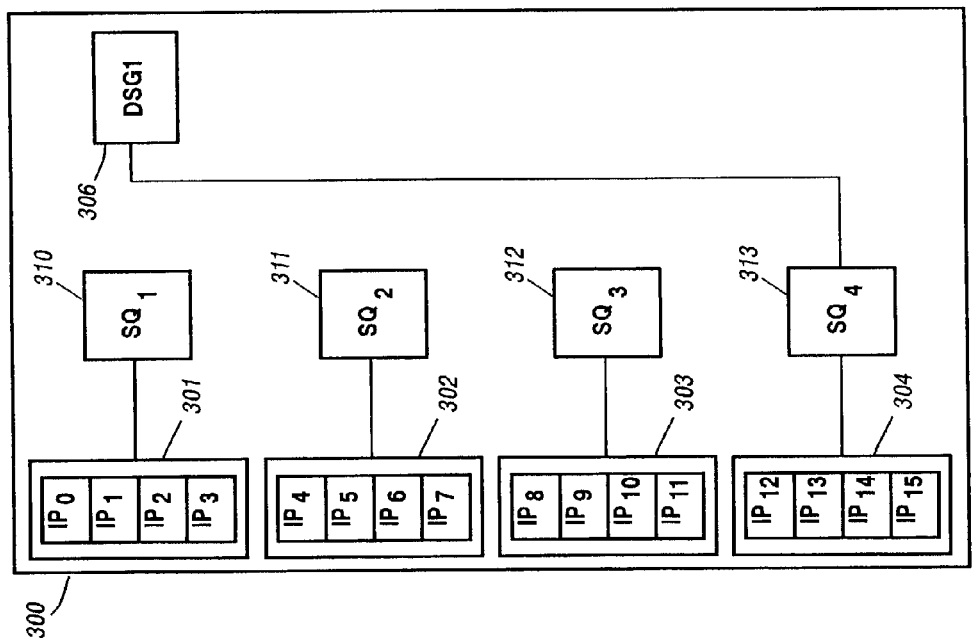

Consider the 16 processor example in block 300 in FIG. 7A with SubPods 301–304. If the system has SQWAFFLVL set to 2 (SubPod), then it has fixed switching queues SQ1–SQ4 (310–313). The OS dedicates the single data-sharing group DSG1 306 to the SubPod 304 with the highest numbered processor (IP15) and uses the single switching queue SQ4 313 for processors IP12–IP15. In this initial embodiment, assignments are exclusive and do not permit the execution of non-dedicated tasks, so all other tasks are queued, using a round-robin mechanism, to SQ1, SQ2, and SQ3, (310–312), running on processors IP0–IP11.

Consider changes to the data-sharing group DSG1 306 and to the hardware configuration of FIG. 7A. If the list of tasks within the data-sharing group is increased then the OS will move the additional tasks to queue SQ4 313. The reverse will happen if the list of tasks in the data-sharing group is reduced.

In this initial embodiment, the OS will reevaluate the dedications whenever a hardware configuration change reduces a switching queue to zero processors. If, say, processors 12–15 are to be removed as in block 300A in FIG. 7B, then the OS will reevaluate the situation when the last of these processors is removed. Provided the system still has at least two switching queues with at least one processor each then the OS will apply the dedications of the data-sharing group DSG1 306A. In this case, there are three populated switching queues left and the data-sharing group DSG1 306A will be moved to switching queue SQ3 312A and processors IP8–IP11. In this initial embodiment, a dedication to a switching queue implies an exclusive assignment of the queue, so the remaining tasks are now confined to SQ1 310A and SQ2 311A and processors IP0–IP7. As there are no queues to create and delete in this initial embodiment, this movement of tasks can happen automatically as tasks become eligible for execution following interruption.

If there had been only one switching queue left there would have been no dedications. The OS will not permit the assignment of the only switching queue. Dynamic Configuration—Preferred Embodiment—Tailored Scope Queues— Example For an example of this dynamic reconfiguration, consider the preferred embodiment, a 16 processor system shown in block 200 of FIG. 6A with four SubPods 201–204 and three switching queues SQ1, SQ2 and SQ3, assigned four, four, and 8 IPs, respectively. The user has declared three data-sharing groups DSGA, DSGB, DSGC, (210–212) in decreasing order of precedence, requiring, let us say 6, 3, and 3 IPs, respectively. For optimal performance, these dedications are rounded up to the next available size of cache neighborhood. Thus, the 6-processor dedication requires an entire Pod of 8 IPs and the 3-processor dedications each require a SubPod of 4 IPs. The OS creates switching queue SQ1 (217) with 8 processors (IP8–IP15) for DSGA, and SQ2 (216) (IP4–IP7) and SQ3 (215) (IP0–IP3) with 4 processors each for DSGB (211) and DSGC (212), respectively. The remainder of the system's tasks are queued to any of switching queues 215–217, depending on the current load balancing situation.

Figure 6B:
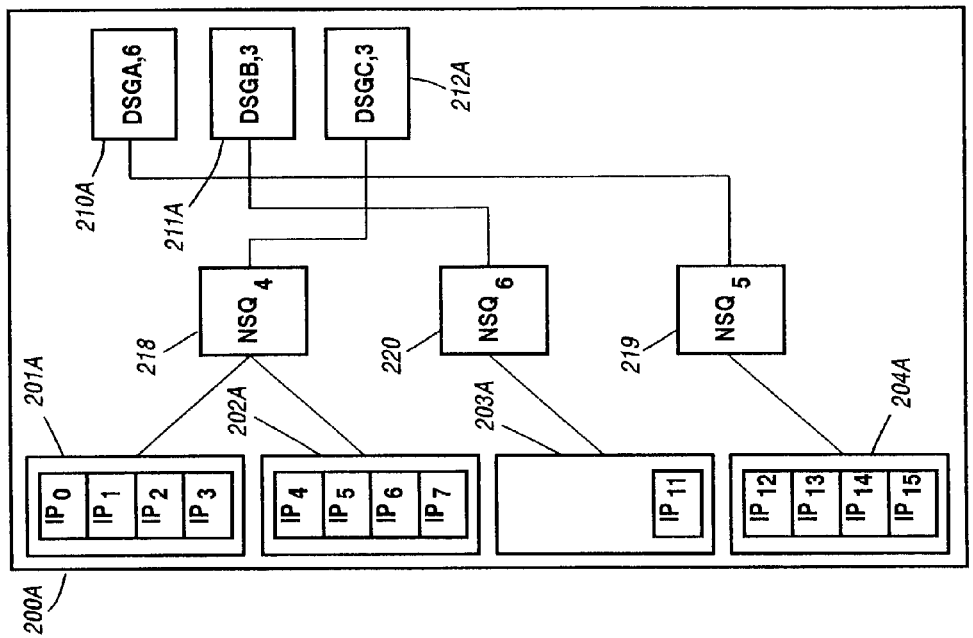
FIGS. 6A and 6B are dynamic configuration block diagrams.
Figure 6A:
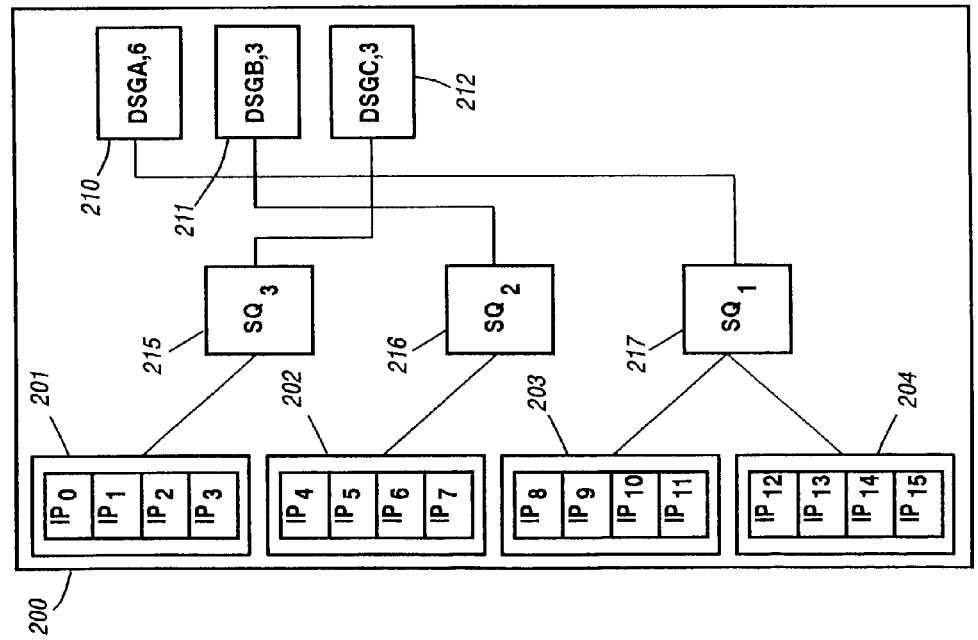

Moving on to FIG. 6B, we have a situation in which the third SubPod 203A processors 811 must be removed from the system. This will impact data-sharing group DSGA 210 and 210A. Typically, in most multiprocessor systems, four processors will not appear to leave at the same time, and the system will actually see four changes, losing one processor at a time. Losing the first two processors will cause a reevaluation but have no impact as switching queue SQ1 217 will still have 6 processors, sufficient for data-sharing group DSGA 210. In such cases it is likely that the OS would detect that no changes or re-queuing is required.

The reevaluation following the removal of the third processor causes the OS to handle the configuration as shown in block 200A in FIG. 6B. SubPod 203A has been reduced to a single processor IP11 and the two SubPods 203A and 204A do not now have enough processing power for DSGA 210A. This time the reevaluation causes the OS to select the only 8 processor Pod available (the cache neighborhood with processors IP0–IP7) and create new switching queue NSQ4 218 with 8 processors (IP0–IP7) for data-sharing group DSGA 210A. It also creates new switching queue NSQ5 219 with 4 processors (IP12–IP15) for data-sharing group DSGB 211A. Data-sharing group DSGC's 212A dedication will fail as there are no SubPods available with sufficient IP resources, and its tasks will be spread, along with all other tasks, across all the remaining queues, including the queue for the lone surviving processor IP11 of the SubPod 203A. As IP11 has no specific assignments it is serviced by a single queue NSQ6 220. When that processor leaves the configuration, completing the removal of SubPod 203A, no data-sharing groups will be impacted but any tasks queued to NSQ6 220 must be redistributed to the remaining queues NSQ4, NSQ5 (218, 219).

Dynamic Configuration—Preferred Embodiment—Virtual Queue—Example

Figure 15A:
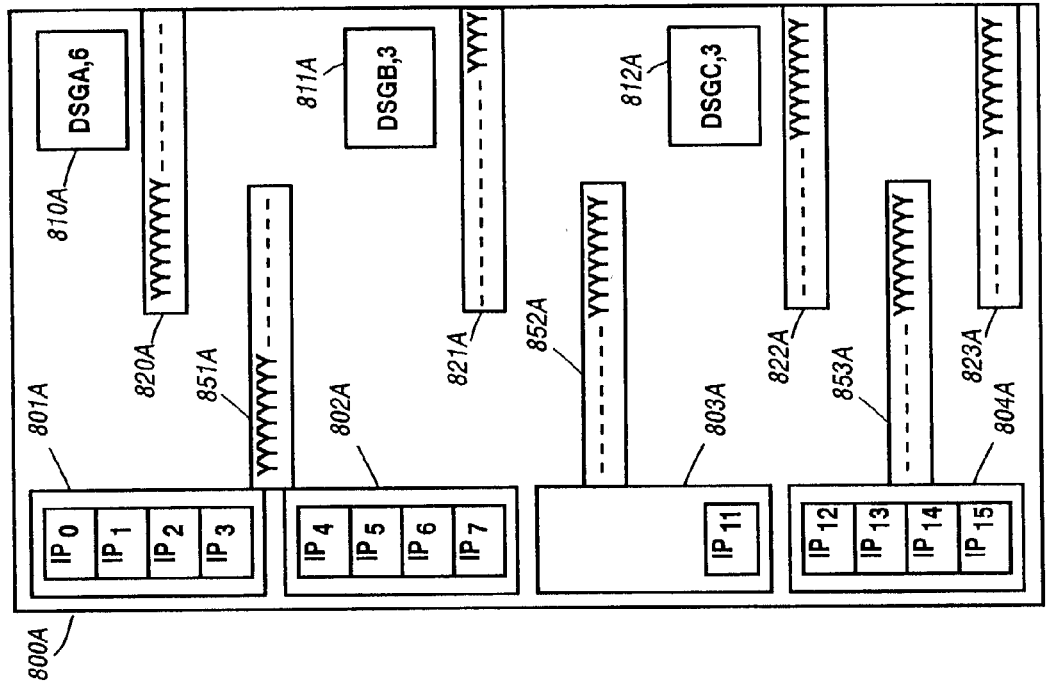
FIGS. 15 and 15A are an example of dedication using a virtual queue and then a subsequent dynamic reconfiguration of the processors.
Figure 15:
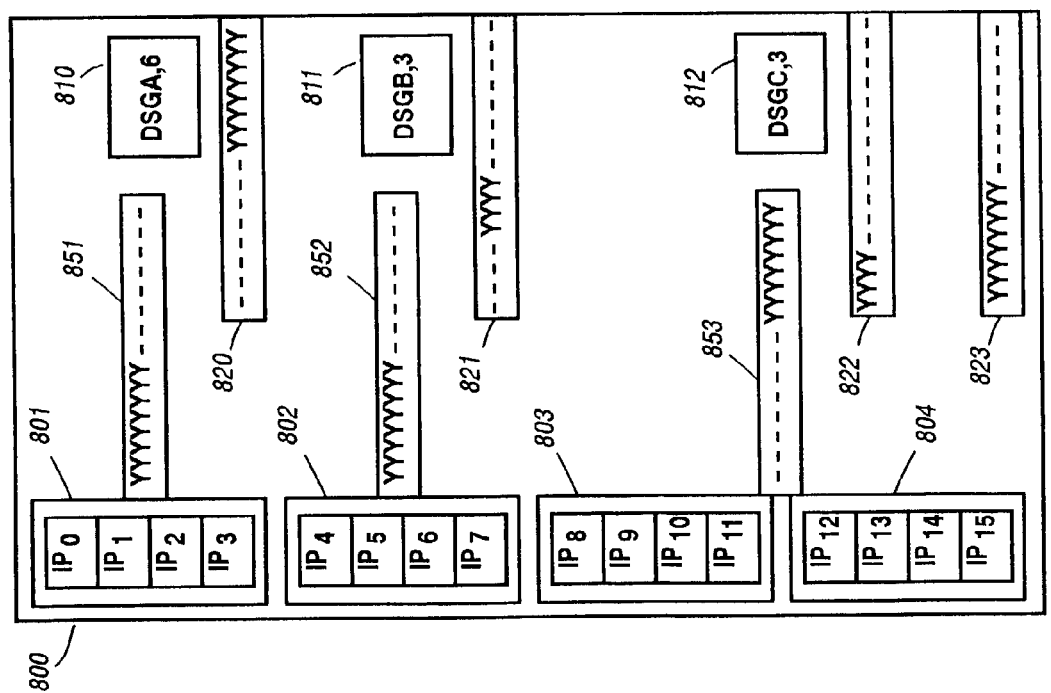

For a similar example of dynamic reconfiguration with the Virtual Queue design, consider the preferred embodiment, a 16 processor system shown in block 800 of FIG. 15 with four SubPods 801–804. The user has declared three data-sharing groups DSGA, DSGB, DSGC, (810–812) in decreasing order of precedence, requiring, let us say 6, 3, and 3 IPs, respectively. In this example, the system is running with SWQAFFLVL set to 0 (processor affinity), so each processor has its own switching queue. Also, the user's message indicates that the dedication of DSGA must forbid the execution of any non-dedicated work by the assigned cache neighborhood.

For optimal performance, these dedications are rounded up to the next available size of cache neighborhood. Thus, the 6-processor dedication requires an entire Pod of 8 IPs (803+804) and the 3-processor dedications each require a SubPod of 4 IPs (802 and 801). For any tasks created within DSGA (810), the OS builds a "stealable/pluckable" mask 820 that indicates that the task may be executed only on processors within SubPods 803 and 804. Similarly, the OS builds masks 821 and 822 for tasks within DSGB and DSGC that limit their execution to SubPods 802 and 801 respectively. The remaining tasks, not members of those data sharing groups, have no dedication and would normally be allowed to execute anywhere, but, in this example, DSGA's dedication did not allow the execution of non-dedicated tasks. Consequently, the OS builds a mask, Mask 823, for those tasks that allows them to execute only on SubPods 801 and 802.

The OS also builds "steal-from" masks for all the systems processors. These masks limit the scope of the processors' plucking and stealing. Processors in SubPods 803 and 804 are confined by DSGA's dedication, so mask 853 indicates that they may only pluck and steal within those SubPods. Subpods 801 and 802 are allowed to execute both dedicated and non-dedicated tasks so their processors' masks indicate that they may pluck and steal within the SubPod and also from each other. The plucking and stealing of dedicated tasks will however be further limited by those tasks' stealable/pluckable masks 820 and 821.

Now let us consider the impact of a dynamic configuration change on this example, and look at the transition from FIG. 15 to FIG. 15A. As with the Tailored Scope Queues example, we have a situation in which the third SubPod 803 and 803A must be removed from the system. This will impact data-sharing group DSGA 810 and 810A. Typically, in most multiprocessor systems, four processors will not appear to leave at the same time, and the system will actually see four changes, losing one processor at a time. Losing the first two processors will cause a reevaluation but have no impact as the two SubPods (803A+804A) will still have 6 processors, sufficient for data-sharing group DSGA 810A. In such cases it is likely that the OS would detect that no change to the assignments is required.

However, action is required to cope with any tasks that are queued to the first two processors to be removed. As the processor is going away, the OS dequeues its tasks and must requeue them to one of the processors within the scope of the dedication, using a round-robin or similar mechanism to assist load-balancing. (In this example, there are no non-dedicated tasks as DSGA's dedication did not permit their execution, but if there had been, those tasks would be similarly requeued to one of the processors permitted to execute non-dedicated tasks.) The reevaluation following the removal of the third processor causes the OS to handle the configuration as shown in block 800A in FIG. 15A. SubPod 803A has been reduced to a single processor IP11 and the two SubPods 803A and 804A do not now have enough processing power for DSGA 810A. This time the reevaluation causes the OS to select the only 8 processor Pod available (the cache neighborhood with processors IP0–IP7) and create new stealable masks 820A for the tasks in the DSGA group and new steal-from masks 851 A for the processors in the pod (801A+802A).

As part of the reevaluation, the OS assigns the second data-sharing group DSGB 811A, which requires 3 processors, to the only remaining fully-populated SubPod 804A with processors IP12–IP15. The tasks in DSGB are given stealable masks 821A that restrict them to those four processors. The processors in SubPod 804A are given steal-from masks 853A that allow them to steal or pluck from any processors that are allowed to execute non-dedicated tasks.

Data-sharing group DSGC's 812A dedication will fail as it requires 3 processors and there are no SubPods available with sufficient resources, and its tasks will be spread, along with all other non-dedicated tasks, across all of the processors that can execute non-dedicated tasks. Accordingly, tasks in DSGC are given stealable masks 822A and non-dedicated tasks are given masks 823A.

The remaining processor IP11 in the remaining SubPod 803A is given a steal-from mask 852A that allows it to steal and pluck from any processor that can execute non-dedicated tasks.

Note that when the reevaluation is complete, all affected tasks must have been dequeued from their current processor queues and requeued to one of the processors described by their stealable masks. The processor is selected by the round-robin mechanism used for initial load-balancing.

When IP11 is eventually removed from the system (as part of the removal of SubPod 803A), all non-dedicated work will be executed on SubPod 804A. Note that removal of IP11 will not cause a reevaluation as no data-sharing groups are impacted, and there is still one SubPod 804A that can execute non-dedicated tasks. It will, however, be necessary to dequeue IP11's tasks and redistribute them to processors within SubPod 804A. There will, of course, be other housekeeping that is needed for the removal (or addition) of a processor, but this housekeeping is not described here as it is well understood within operating systems that support the dynamic addition and removal of processors.

What is claimed is:

1. A virtual queue method for allocating tasks by a dispatcher algorithm to switching queues of individual processors in a multiprocessor computer system, said method comprising;
    a) allowing a user to establish priority for tasks to be allocated to individual processor switching queues,
    b) placing a value, indicating a priority for each said task queued for an said individual processor for on said individual processor switching queues, said value being associated with said user established priority,
    c) placing a reference for a highest priority task of said each task having a queued value on said individual processor switching queue, from each said individual processor switching queue onto a virtual queue,
    d) at a time a given processor is ready to perform a task, searching said virtual queue for a said reference for any tasks which may have a higher priority than any priority value that currently exists on said given processor's individual processor switching queue, and
    e) if a task reference on said virtual queue has a higher priority than task priority values existing on said given processor's individual processor switching queue, plucking said task from said virtual queue and,
    running said plucked task on said given processor,
    else, if no task reference on said virtual queue has a higher priority than at least one task priority on said given processor's individual processor switching queue, running a one of said at least one tasks from said given processor's individual processor switching queue.

2. The method of claim 1 wherein said given processor may be any one of all individual processors used by said multiprocessor computer system and wherein said virtual queue is accessed to determine if a higher priority task has been placed thereon by said all individual processors.

3. The method of claim 1 wherein the decision step e) requires an additional decision to determine if a second processor which has a task on said virtual queue that has higher priority than a task on said given processor's individual switching queue is one that said given processor is entitled to pluck from, and if said second processor is not one said given processor is entitled to pluck from, then said decision step e) performs the task identified in the else statement.

4. The method of claim 3 wherein said additional decision is determined with reference to a buddy mask.

5. The method of claim 3 wherein said additional decision is determined with reference to a steal-from mask.

6. The method of claim 1 wherein when a task is created the method comprises the additional step;

f) determining if a newly created task is a part of a predetermined dedicated Data Sharing Group, if yes, setting a stealable mask for said newly created task to allow stealing by any processor in its assigned cache neighborhood based on the stealable mask parameters related to said predetermined dedicated Data Sharing Group, or if no, setting a stealable mask for said newly created task to allow stealing by any cache neighborhood.

7. The method of claim 1 further comprising, each time a user applies a dedication list, updates a dedication list or a processor configuration changes in a multiprocessor computer system employing the method of claim 1:

I. for each dedication to a Data Sharing Group in the list, finding the highest-numbered non-exclusive cache neighborhood which satisfies said dedication's requirements creating a steal-from mask for this found cache neighborhood, indicating this Data Sharing Group's dedication, II. after I. Is complete, creating a system-wide steal-from mask for non-dedicated cache neighborhoods.

8. The method of claim 7 wherein part I further comprises; indicating if said Data Sharing Group is exclusive or if non dedicated tasks are permitted to run in this Data Sharing Group's cache neighborhood and wherein said part II. further comprises for each processor not in an exclusive assignment, setting said each not in an exclusive assignment processor's steal-from mask to that of the non-exclusively assigned neighborhood.

9. A digital storage medium having stored thereon a sequence of instructions to cause a device to perform a virtual queue method for allocating tasks by a dispatcher algorithm to switching queues of individual processors in a multiprocessor computer system, said method comprising;

a) allowing a user to establish priority for tasks to be allocated to individual processor switching queues, b) placing a value, indicating a priority for each said task queued for an said individual processor for on said individual processor switching queues, said value being associated with said user established priority, c) placing a reference for a highest priority task of said each task having a queued value on said individual processor switching queue, from each said individual processor switching queue onto a virtual queue, d) at a time a given processor is ready to perform a task, searching said virtual queue for a said reference for any tasks which may have a higher priority than any priority value that currently exists on said given processor's individual processor switching queue, and e) if a task reference on said virtual queue has a higher priority than task priority values existing on said given processor's individual processor switching queue, plucking said task from said virtual queue and, running said plucked task on said given processor, else, if no task reference on said virtual queue has a higher priority than at least one task priority on said given processor's individual processor switching queue, running a one of said at least one tasks from said given processor's individual processor switching queue.

10. The storage medium of claim 9 wherein said given processor may be any one of all individual processors used by said multiprocessor computer system and wherein said virtual queue is accessed to determine if a higher priority task has been placed thereon by said all individual processors.

11. The storage medium of claim 9 wherein the decision step e) requires an additional decision to determine if a second processor which has a task on said virtual queue that has higher priority than a task on said given processor's individual switching queue is one that said given processor is entitled to pluck from, and if said second processor is not one said given processor is entitled to pluck from, then said decision step e) performs the task identified in the else statement.

12. The storage medium of claim 11 wherein said additional decision is determined with reference to a buddy mask.

13. The storage medium of claim 11 wherein said additional decision is determined with reference to a steal-from mask.

14. The storage medium of claim 9 wherein when a task is created the method comprises the additional step;

f) determining if a newly created task is a part of a predetermined dedicated Data Sharing Group, if yes, setting a stealable mask for said newly created task to allow stealing by any processor in its assigned cache neighborhood based on the stealable mask parameters related to said predetermined dedicated Data Sharing Group, or if no, selling a stealable mask for said newly created task to allow stealing by any cache neighborhood.

15. The storage medium of claim 9 further comprising, each time a user applies a dedication list, updates a dedication list or a processor configuration changes in a multiprocessor computer system employing the method of claim 1:

III. for each dedication to a Data Sharing Group in the list, finding the highest-numbered non-exclusive cache neighborhood which satisfies said dedication's requirements creating a steal-from mask for this found cache neighborhood, indicating this Data Sharing Group's dedication, IV. after I. Is complete, creating a system-wide steal-from mask for non-dedicated cache neighborhoods.

16. The storage medium of claim 15 wherein part I further comprises;

indicating if said Data Sharing Group is exclusive or if non dedicated tasks are permitted to run in this Data Sharing Group's cache neighborhood and wherein said part II. further comprises for each processor not in an exclusive assignment, setting said each not in an exclusive assignment processor's steal-from mask to that of the non-exclusively assigned neighborhood.

* * * * *